United States Patent
Lee et al.

(10) Patent No.: US 11,734,546 B2
(45) Date of Patent: Aug. 22, 2023

(54) METHOD AND APPARATUS FOR RECOMMENDING FOOD AND DRINK BASED ON ARTIFICIAL INTELLIGENCE-BASED USER STATUS

(71) Applicant: LG ELECTRONICS INC., Seoul (KR)

(72) Inventors: Jaemyung Lee, Seoul (KR); Jichan Maeng, Seoul (KR); Seungjun Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 896 days.

(21) Appl. No.: 16/585,882

(22) Filed: Sep. 27, 2019

(65) Prior Publication Data
US 2020/0042865 A1 Feb. 6, 2020

(30) Foreign Application Priority Data
Aug. 21, 2019 (KR) .................. 10-2019-0102606

(51) Int. Cl.
| | |
|---|---|
| G06N 3/045 | (2023.01) |
| G06N 3/08 | (2023.01) |
| G06F 16/951 | (2019.01) |
| H04W 4/70 | (2018.01) |
| G05D 1/00 | (2006.01) |
| G05D 1/02 | (2020.01) |
| H04W 4/44 | (2018.01) |

(52) U.S. Cl.
CPC ........... *G06N 3/045* (2023.01); *G06F 16/951* (2019.01); *G06N 3/08* (2013.01); *G05D 1/0038* (2013.01); *G05D 1/0088* (2013.01); *G05D 1/0246* (2013.01); *G05D 2201/0203* (2013.01); *H04W 4/44* (2018.02); *H04W 4/70* (2018.02)

(58) Field of Classification Search
None
See application file for complete search history.

(56) References Cited

U.S. PATENT DOCUMENTS

| | | | |
|---|---|---|---|
| 2014/0193783 A1* | 7/2014 | Jeong | F25D 29/00 434/127 |
| 2014/0341141 A1* | 11/2014 | Nguyen | H04L 5/0094 370/329 |
| 2018/0032997 A1* | 2/2018 | Gordon | G06Q 30/0269 |
| 2018/0159926 A1* | 6/2018 | Sun | H04W 72/042 |
| 2020/0130706 A1* | 4/2020 | Rakshit | B60W 40/09 |

* cited by examiner

*Primary Examiner* — Angela Nguyen
(74) *Attorney, Agent, or Firm* — Birch, Stewart, Kolasch & Birch, LLP

(57) ABSTRACT

A method and a device for recommending food based on an artificial intelligence based user status are disclosed. The method includes obtaining use information from a mobile terminal and an external terminal connected to the mobile terminal, determining a user status through an AI device, and determining a preferred food of the user based on the user status, thereby providing convenience for the user's life. The device for recommending food based on the artificial intelligence based user status can be associated with an artificial intelligence module, an unmanned aerial vehicle (UAV), a robot, an augmented reality (AR) device, a virtual reality (VR) device, devices related to 5G services, and the like.

17 Claims, 18 Drawing Sheets

(a)

(b)

METHOD AND APPARATUS FOR RECOMMENDING FOOD AND DRINK BASED ON ARTIFICIAL INTELLIGENCE-BASED USER STATUS

This application claims the priority benefit of Korean Patent Application No. 10-2019-0102606 filed on Aug. 21, 2019, which is incorporated herein by reference for all purposes as if fully set forth herein.

BACKGROUND OF THE INVENTION

Field of the Invention

The present disclosure relates to a method and a device for recommending food based on an artificial intelligence based user status, and more particularly to a method and a device for recommending food based on an artificial intelligence based user status capable of determining a user's status and recommending food based on a result of the determination.

Discussion of the Related Art

An artificial intelligence (AI) system is a computer system implementing human-level intelligence and is a system, in which a machine learns and judges by itself, and becomes smarter, unlike existing rule-based smart systems. The more the AI system is used, the higher a recognition rate of the AI system is. Further, the AI system can more accurately understand tastes of users. Thus, the existing rule-based smart systems are increasingly being replaced by deep learning-based AI systems.

An AI technology consists of machine learning and element technologies using the machine learning. The machine learning is an algorithmic technique that classifies and learns feature information of data. The element technology is a technology utilizing a machine learning algorithm, such as deep learning, and may consist of technical fields such as linguistic understanding, visual understanding, inference/prediction, knowledge representation, and motion control.

A related art has proposed an AI device that obtains information on food ingredients stored in kitchen appliances of the user and suggests the optimum cooking based on the information. However, it is necessary to select foods considering emotional conditions and health conditions of the user who eats. Further, since each person has a different favorite food, it necessary to provide a customized function to each user.

SUMMARY OF THE INVENTION

An object of the present disclosure is to address the above-described and other needs and/or problems.

Another object of the present disclosure is to implement a method and a device for recommending food based on an artificial intelligence based user status capable of determining a mood of a user by obtaining use information from an external terminal connected to a mobile terminal of the user.

Another object of the present disclosure is to implement a method and a device for recommending food based on an artificial intelligence based user status capable of recommending information such as recommendable dishes or drinks from information of articles inside kitchen appliances in consideration of emotional conditions of a user.

Another object of the present disclosure is to implement a method and a device for recommending food based on an artificial intelligence based user status capable of providing customized functions to each user through a feedback of a user.

In one aspect of the present disclosure, there is provided a method for recommending, by an artificial intelligence based mobile terminal, food based on an artificial intelligence based user status, the method comprising obtaining at least one use information from the mobile terminal and an external terminal connected to the mobile terminal; applying the use information to a first artificial neural network (ANN) model that has been previously learned; determining a user status of a user based on an output value of the first ANN model; and determining a preferred food of the user based on user status information of the user, wherein the user status includes at least one of an emotional condition or a healthy condition.

The first ANN model may be an ANN model that is supervised learned by applying the use information as learning data. The use information may include at least one of image information including the user, location information of the mobile terminal, hash tag information, previously input information about the user, information on music play history, body state information related to health of the user, facial recognition information of the user of an image, or history information about a past user status of the user.

The determining of the preferred food may comprise receiving stored food information of a kitchen appliance from a network; applying the stored food information and the user status information to a second ANN model; and determining the preferred food that is able to be set from the stored food based on an output value of the second ANN model.

The second ANN model may be an ANN model that is supervised learned by setting the user status information and the stored food information as input layer learning data and setting information about the preferred food as output layer learning data. The information on the preferred food may include at least one of image information or recipe information about the preferred food.

The preferred food may include at least one of a preferred cooking, a preferred drink, or a combination of the preferred cooking and the preferred drink.

The preferred cooking may be a cooking that is classified as being taken at the same time as the preferred drink based on web crawling information or past history information of the user.

The method may further comprise displaying the information about the preferred food on a display unit of the mobile terminal.

The first ANN model may be stored in a network. The applying of the use information to the first ANN model may comprise transmitting the use information to the network; and obtaining a result of applying the use information received from the network to the first ANN model.

The second ANN model may be stored in the network. The applying of the stored food information and the user status information to the second ANN model may comprise transmitting the stored food information to the network; and obtaining a result of applying the stored food information and the user status information received from the network to the second ANN model.

In another aspect of the present disclosure, there is provided a method for recommending, by an artificial intelligence based kitchen appliance, food based on an artificial intelligence based user status, the method comprising receiving information on a user status of a user from a mobile terminal connected to the kitchen appliance; and determining a preferred food of the user based on the user status.

A food recommendation device based on an artificial intelligence based user status, the food recommendation device comprising a memory; a communication module; and a processor, wherein the processor is configured to apply use information of a mobile terminal and an external terminal connected to the mobile terminal, that is received through the communication module, to a first artificial neural network (ANN) model that has been previously learned, and determine a user status of a user based on an output value of the first ANN model.

Effects of a method and a device for recommending food based on an artificial intelligence based user status according to an embodiment of the present disclosure are described as follows.

The present disclosure can determine a mood of a user by obtaining use information from an external terminal connected to a mobile terminal of the user.

The present disclosure can recommend information such as recommendable dishes or drinks from information of articles inside kitchen appliances in consideration of emotional conditions of a user.

The present disclosure can provide customized preferred food information to each user through a feedback of the user.

Effects obtainable from the present disclosure are not limited by the effects mentioned above, and other effects which are not mentioned above can be clearly understood from the following description by those skilled in the art to which the present disclosure pertains.

BRIEF DESCRIPTION OF THE DRAWINGS

The accompanying drawings, which are included to provide a further understanding of the invention, illustrate embodiments of the invention and together with the description serve to explain the principle of the invention.

DETAILED DESCRIPTION OF THE EMBODIMENTS

Figure 1:
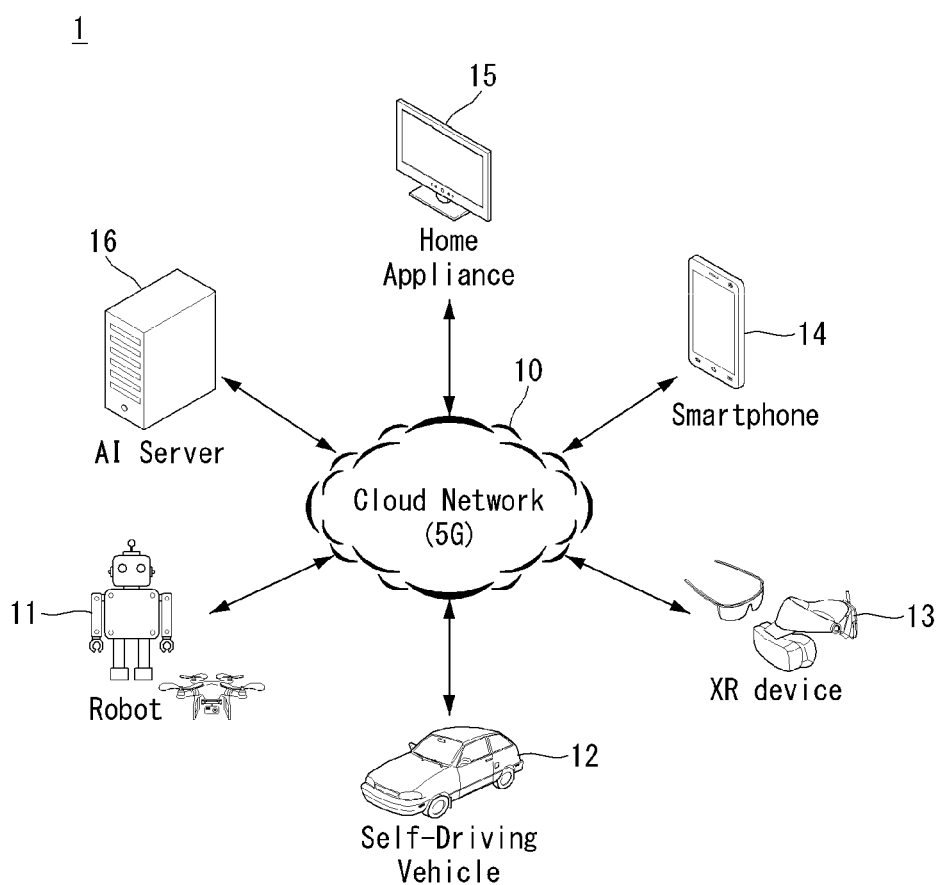
FIG. 1 illustrates one embodiment of an AI device.

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus may be used interchangeably and do not have any distinguishable meanings or functions. Further, in the following description, if a detailed description of known techniques associated with the present disclosure would unnecessarily obscure the gist of the present disclosure, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

[5G Scenario]

The three main requirement areas in the 5G system are (1) enhanced Mobile Broadband (eMBB) area, (2) massive Machine Type Communication (mMTC) area, and (3) Ultra-Reliable and Low Latency Communication (URLLC) area.

Some use case may require a plurality of areas for optimization, but other use case may focus only one Key Performance Indicator (KPI). The 5G system supports various use cases in a flexible and reliable manner.

eMBB far surpasses the basic mobile Internet access, supports various interactive works, and covers media and entertainment applications in the cloud computing or augmented reality environment. Data is one of core driving elements of the 5G system, which is so abundant that for the first time, the voice-only service may be disappeared. In the 5G, voice is expected to be handled simply by an application program using a data connection provided by the communication system. Primary causes of increased volume of traffic are increase of content size and increase of the number of applications requiring a high data transfer rate. Streaming service (audio and video), interactive video, and mobile Internet connection will be more heavily used as more and more devices are connected to the Internet. These application programs require always-on connectivity to push real-time information and notifications to the user. Cloud-based storage and applications are growing rapidly in the mobile communication platforms, which may be applied to both of business and entertainment uses. And the cloud-based storage is a special use case that drives growth of uplink data transfer rate. The 5G is also used for cloud-based remote works and requires a much shorter end-to-end latency to ensure excellent user experience when a tactile interface is used. Entertainment, for example, cloud-based game and video streaming, is another core element that strengthens the requirement for mobile broadband capability. Entertainment is essential for smartphones and tablets in any place including a high mobility environment such as a train, car, and plane. Another use case is augmented reality for entertainment and information search. Here, augmented reality requires very low latency and instantaneous data transfer.

Also, one of highly expected 5G use cases is the function that connects embedded sensors seamlessly in every possible area, namely the use case based on mMTC. Up to 2020, the number of potential IoT devices is expected to reach 20.4 billion. Industrial IoT is one of key areas where the 5G performs a primary role to maintain infrastructure for smart city, asset tracking, smart utility, agriculture and security.

URLLC includes new services which may transform industry through ultra-reliable/ultra-low latency links, such as remote control of major infrastructure and self-driving cars. The level of reliability and latency are essential for smart grid control, industry automation, robotics, and drone control and coordination.

Next, a plurality of use cases will be described in more detail.

The 5G may complement Fiber-To-The-Home (FTTH) and cable-based broadband (or DOCSIS) as a means to provide a stream estimated to occupy hundreds of megabits per second up to gigabits per second. This fast speed is required not only for virtual reality and augmented reality but also for transferring video with a resolution more than 4K (6K, 8K or more). VR and AR applications almost always include immersive sports games. Specific application programs may require a special network configuration. For example, in the case of VR game, to minimize latency, game service providers may have to integrate a core server with the edge network service of the network operator.

Automobiles are expected to be a new important driving force for the 5G system together with various use cases of mobile communication for vehicles. For example, entertainment for passengers requires high capacity and high mobile broadband at the same time. This is so because users continue to expect a high-quality connection irrespective of their location and moving speed. Another use case in the automotive field is an augmented reality dashboard. The augmented reality dashboard overlays information, which is a perception result of an object in the dark and contains distance to the object and object motion, on what is seen through the front window. In a future, a wireless module enables communication among vehicles, information exchange between a vehicle and supporting infrastructure, and information exchange among a vehicle and other connected devices (for example, devices carried by a pedestrian). A safety system guides alternative courses of driving so that a driver may drive his or her vehicle more safely and to reduce the risk of accident. The next step will be a remotely driven or self-driven vehicle. This step requires highly reliable and highly fast communication between different self-driving vehicles and between a self-driving vehicle and infrastructure. In the future, it is expected that a self-driving vehicle takes care of all of the driving activities while a human driver focuses on dealing with an abnormal driving situation that the self-driving vehicle is unable to recognize. Technical requirements of a self-driving vehicle demand ultra-low latency and ultra-fast reliability up to the level that traffic safety may not be reached by human drivers.

The smart city and smart home, which are regarded as essential to realize a smart society, will be embedded into a high-density wireless sensor network. Distributed networks comprising intelligent sensors may identify conditions for cost-efficient and energy-efficient conditions for maintaining cities and homes. A similar configuration may be applied for each home. Temperature sensors, window and heating controllers, anti-theft alarm devices, and home appliances will be all connected wirelessly. Many of these sensors typified with a low data transfer rate, low power, and low cost. However, for example, real-time HD video may require specific types of devices for the purpose of surveillance.

As consumption and distribution of energy including heat or gas is being highly distributed, automated control of a distributed sensor network is required. A smart grid collects information and interconnect sensors by using digital information and communication technologies so that the distributed sensor network operates according to the collected information. Since the information may include behaviors of energy suppliers and consumers, the smart grid may help improving distribution of fuels such as electricity in terms of efficiency, reliability, economics, production sustainability, and automation. The smart grid may be regarded as a different type of sensor network with a low latency.

The health-care sector has many application programs that may benefit from mobile communication. A communication system may support telemedicine providing a clinical care from a distance. Telemedicine may help reduce barriers to distance and improve access to medical services that are not readily available in remote rural areas. It may also be used to save lives in critical medical and emergency situations. A wireless sensor network based on mobile communication may provide remote monitoring and sensors for parameters such as the heart rate and blood pressure.

Wireless and mobile communication are becoming increasingly important for industrial applications. Cable wiring requires high installation and maintenance costs. Therefore, replacement of cables with reconfigurable wireless links is an attractive opportunity for many industrial applications. However, to exploit the opportunity, the wireless connection is required to function with a latency similar to that in the cable connection, to be reliable and of large capacity, and to be managed in a simple manner. Low latency and very low error probability are new requirements that lead to the introduction of the 5G system.

Logistics and freight tracking are important use cases of mobile communication, which require tracking of an inventory and packages from any place by using location-based information system. The use of logistics and freight tracking typically requires a low data rate but requires large-scale and reliable location information.

The present disclosure to be described below may be implemented by combining or modifying the respective embodiments to satisfy the aforementioned requirements of the 5G system.

FIG. 1 illustrates one embodiment of an AI device.

Referring to FIG. 1, in the AI system, at least one or more of an AI server 16, robot 11, self-driving vehicle 12, XR device 13, smartphone 14, or home appliance 15 are connected to a cloud network 10. Here, the robot 11, self-driving vehicle 12, XR device 13, smartphone 14, or home appliance 15 to which the AI technology has been applied may be referred to as an AI device (11 to 15).

The cloud network 10 may comprise part of the cloud computing infrastructure or refer to a network existing in the cloud computing infrastructure. Here, the cloud network 10 may be constructed by using the 3G network, 4G or Long Term Evolution (LTE) network, or 5G network.

In other words, individual devices (11 to 16) constituting the AI system may be connected to each other through the cloud network 10. In particular, each individual device (11 to 16) may communicate with each other through the eNB but may communicate directly to each other without relying on the eNB.

The AI server 16 may include a server performing AI processing and a server performing computations on big data.

The AI server 16 may be connected to at least one or more of the robot 11, self-driving vehicle 12, XR device 13, smartphone 14, or home appliance 15, which are AI devices constituting the AI system, through the cloud network 10 and may help at least part of AI processing conducted in the connected AI devices (11 to 15).

At this time, the AI server 16 may teach the artificial neural network according to a machine learning algorithm on behalf of the AI device (11 to 15), directly store the learning model, or transmit the learning model to the AI device (11 to 15).

At this time, the AI server 16 may receive input data from the AI device (11 to 15), infer a result value from the received input data by using the learning model, generate a response or control command based on the inferred result value, and transmit the generated response or control command to the AI device (11 to 15).

Similarly, the AI device (11 to 15) may infer a result value from the input data by employing the learning model directly and generate a response or control command based on the inferred result value.

<AI+Robot>

By employing the AI technology, the robot 11 may be implemented as a guide robot, transport robot, cleaning robot, wearable robot, entertainment robot, pet robot, or unmanned flying robot.

The robot 11 may include a robot control module for controlling its motion, where the robot control module may correspond to a software module or a chip which implements the software module in the form of a hardware device.

The robot 11 may obtain status information of the robot 11, detect (recognize) the surroundings and objects, generate map data, determine a travel path and navigation plan, determine a response to user interaction, or determine motion by using sensor information obtained from various types of sensors.

Here, the robot 11 may use sensor information obtained from at least one or more sensors among lidar, radar, and camera to determine a travel path and navigation plan.

The robot 11 may perform the operations above by using a learning model built on at least one or more artificial neural networks. For example, the robot 11 may recognize the surroundings and objects by using the learning model and determine its motion by using the recognized surroundings or object information. Here, the learning model may be the one trained by the robot 11 itself or trained by an external device such as the AI server 16.

At this time, the robot 11 may perform the operation by generating a result by employing the learning model directly but also perform the operation by transmitting sensor information to an external device such as the AI server 16 and receiving a result generated accordingly.

The robot 11 may determine a travel path and navigation plan by using at least one or more of object information detected from the map data and sensor information or object information obtained from an external device and navigate according to the determined travel path and navigation plan by controlling its locomotion platform.

Map data may include object identification information about various objects disposed in the space in which the robot 11 navigates. For example, the map data may include object identification information about static objects such as wall and doors and movable objects such as a flowerpot and a desk. And the object identification information may include the name, type, distance, location, and so on.

Also, the robot 11 may perform the operation or navigate the space by controlling its locomotion platform based on the control/interaction of the user. At this time, the robot 11 may obtain intention information of the interaction due to the user's motion or voice command and perform an operation by determining a response based on the obtained intention information.

<AI+Autonomous Navigation>

By employing the AI technology, the self-driving vehicle 12 may be implemented as a mobile robot, unmanned ground vehicle, or unmanned aerial vehicle.

The self-driving vehicle 12 may include an autonomous navigation module for controlling its autonomous navigation function, where the autonomous navigation control module may correspond to a software module or a chip which implements the software module in the form of a hardware device. The autonomous navigation control module may be installed inside the self-driving vehicle 12 as a constituting element thereof or may be installed outside the self-driving vehicle 12 as a separate hardware component.

The self-driving vehicle 12 may obtain status information of the self-driving vehicle 12, detect (recognize) the surroundings and objects, generate map data, determine a travel path and navigation plan, or determine motion by using sensor information obtained from various types of sensors.

Like the robot 11, the self-driving vehicle 12 may use sensor information obtained from at least one or more sensors among lidar, radar, and camera to determine a travel path and navigation plan.

In particular, the self-driving vehicle 12 may recognize an occluded area or an area extending over a predetermined distance or objects located across the area by collecting sensor information from external devices or receive recognized information directly from the external devices.

The self-driving vehicle 12 may perform the operations above by using a learning model built on at least one or more artificial neural networks. For example, the self-driving vehicle 12 may recognize the surroundings and objects by using the learning model and determine its navigation route by using the recognized surroundings or object information. Here, the learning model may be the one trained by the self-driving vehicle 12 itself or trained by an external device such as the AI server 16.

At this time, the self-driving vehicle 12 may perform the operation by generating a result by employing the learning model directly but also perform the operation by transmitting sensor information to an external device such as the AI server 16 and receiving a result generated accordingly.

The self-driving vehicle 12 may determine a travel path and navigation plan by using at least one or more of object information detected from the map data and sensor information or object information obtained from an external device and navigate according to the determined travel path and navigation plan by controlling its driving platform.

Map data may include object identification information about various objects disposed in the space (for example, road) in which the self-driving vehicle 12 navigates. For example, the map data may include object identification information about static objects such as streetlights, rocks and buildings and movable objects such as vehicles and pedestrians. And the object identification information may include the name, type, distance, location, and so on.

Also, the self-driving vehicle 12 may perform the operation or navigate the space by controlling its driving platform based on the control/interaction of the user. At this time, the self-driving vehicle 12 may obtain intention information of the interaction due to the user's motion or voice command and perform an operation by determining a response based on the obtained intention information.

<AI+XR>

By employing the AI technology, the XR device 13 may be implemented as a Head-Mounted Display (HMD), Head-Up Display (HUD) installed at the vehicle, TV, mobile phone, smartphone, computer, wearable device, home appliance, digital signage, vehicle, robot with a fixed platform, or mobile robot.

The XR device 13 may obtain information about the surroundings or physical objects by generating position and attribute data about 3D points by analyzing 3D point cloud or image data acquired from various sensors or external devices and output objects in the form of XR objects by rendering the objects for display.

The XR device 13 may perform the operations above by using a learning model built on at least one or more artificial neural networks. For example, the XR device 13 may recognize physical objects from 3D point cloud or image data by using the learning model and provide information corresponding to the recognized physical objects. Here, the learning model may be the one trained by the XR device 13 itself or trained by an external device such as the AI server 16.

At this time, the XR device 13 may perform the operation by generating a result by employing the learning model directly but also perform the operation by transmitting sensor information to an external device such as the AI server 16 and receiving a result generated accordingly.

<AI+Robot+Autonomous Navigation>

By employing the AI and autonomous navigation technologies, the robot 11 may be implemented as a guide robot, transport robot, cleaning robot, wearable robot, entertainment robot, pet robot, or unmanned flying robot.

The robot 11 employing the AI and autonomous navigation technologies may correspond to a robot itself having an autonomous navigation function or a robot 11 interacting with the self-driving vehicle 12.

The robot 11 having the autonomous navigation function may correspond collectively to the devices which may move autonomously along a given path without control of the user or which may move by determining its path autonomously.

The robot 11 and the self-driving vehicle 12 having the autonomous navigation function may use a common sensing method to determine one or more of the travel path or navigation plan. For example, the robot 11 and the self-driving vehicle 12 having the autonomous navigation function may determine one or more of the travel path or navigation plan by using the information sensed through lidar, radar, and camera.

The robot 11 interacting with the self-driving vehicle 12, which exists separately from the self-driving vehicle 12, may be associated with the autonomous navigation function inside or outside the self-driving vehicle 12 or perform an operation associated with the user riding the self-driving vehicle 12.

At this time, the robot 11 interacting with the self-driving vehicle 12 may obtain sensor information in place of the self-driving vehicle 12 and provide the sensed information to the self-driving vehicle 12; or may control or assist the autonomous navigation function of the self-driving vehicle 12 by obtaining sensor information, generating information of the surroundings or object information, and providing the generated information to the self-driving vehicle 12.

Also, the robot 11 interacting with the self-driving vehicle 12 may control the function of the self-driving vehicle 12 by monitoring the user riding the self-driving vehicle 12 or through interaction with the user. For example, if it is determined that the driver is drowsy, the robot 11 may activate the autonomous navigation function of the self-driving vehicle 12 or assist the control of the driving platform of the self-driving vehicle 12. Here, the function of the self-driving vehicle 12 controlled by the robot 12 may include not only the autonomous navigation function but also the navigation system installed inside the self-driving vehicle 12 or the function provided by the audio system of the self-driving vehicle 12.

Also, the robot 11 interacting with the self-driving vehicle 12 may provide information to the self-driving vehicle 12 or assist functions of the self-driving vehicle 12 from the outside of the self-driving vehicle 12. For example, the robot 11 may provide traffic information including traffic sign information to the self-driving vehicle 12 like a smart traffic light or may automatically connect an electric charger to the charging port by interacting with the self-driving vehicle 12 like an automatic electric charger of the electric vehicle.

<AI+Robot+XR>

By employing the AI technology, the robot 11 may be implemented as a guide robot, transport robot, cleaning robot, wearable robot, entertainment robot, pet robot, or unmanned flying robot.

The robot 11 employing the XR technology may correspond to a robot which acts as a control/interaction target in the XR image. In this case, the robot 11 may be distinguished from the XR device 13, both of which may operate in conjunction with each other.

If the robot 11, which acts as a control/interaction target in the XR image, obtains sensor information from the sensors including a camera, the robot 11 or XR device 13 may generate an XR image based on the sensor information, and the XR device 13 may output the generated XR image. And the robot 11 may operate based on the control signal received through the XR device 13 or based on the interaction with the user.

For example, the user may check the XR image corresponding to the viewpoint of the robot 11 associated remotely through an external device such as the XR device 13, modify the navigation path of the robot 11 through interaction, control the operation or navigation of the robot 11, or check the information of nearby objects.

<AI+Autonomous Navigation+XR>

By employing the AI and XR technologies, the self-driving vehicle 12 may be implemented as a mobile robot, unmanned ground vehicle, or unmanned aerial vehicle.

The self-driving vehicle 12 employing the XR technology may correspond to a self-driving vehicle having a means for providing XR images or a self-driving vehicle which acts as a control/interaction target in the XR image. In particular, the self-driving vehicle 12 which acts as a control/interaction target in the XR image may be distinguished from the XR device 13, both of which may operate in conjunction with each other.

The self-driving vehicle 12 having a means for providing XR images may obtain sensor information from sensors including a camera and output XR images generated based on the sensor information obtained. For example, by displaying an XR image through HUD, the self-driving vehicle 12 may provide XR images corresponding to physical objects or image objects to the passenger.

At this time, if an XR object is output on the HUD, at least part of the XR object may be output so as to be overlapped with the physical object at which the passenger gazes. On the other hand, if an XR object is output on a display installed inside the self-driving vehicle 12, at least part of the XR object may be output so as to be overlapped with an image object. For example, the self-driving vehicle 12 may output XR objects corresponding to the objects such as roads, other vehicles, traffic lights, traffic signs, bicycles, pedestrians, and buildings.

If the self-driving vehicle 12, which acts as a control/interaction target in the XR image, obtains sensor information from the sensors including a camera, the self-driving vehicle 12 or XR device 13 may generate an XR image based on the sensor information, and the XR device 13 may output the generated XR image. And the self-driving vehicle 12 may operate based on the control signal received through an external device such as the XR device 13 or based on the interaction with the user.

[Extended Reality Technology]

eXtended Reality (XR) refers to all of Virtual Reality (VR), Augmented Reality (AR), and Mixed Reality (MR). The VR technology provides objects or backgrounds of the real world only in the form of CG images, AR technology provides virtual CG images overlaid on the physical object images, and MR technology employs computer graphics technology to mix and merge virtual objects with the real world.

MR technology is similar to AR technology in a sense that physical objects are displayed together with virtual objects. However, while virtual objects supplement physical objects in the AR, virtual and physical objects co-exist as equivalents in the MR.

The XR technology may be applied to Head-Mounted Display (HMD), Head-Up Display (HUD), mobile phone, tablet PC, laptop computer, desktop computer, TV, digital signage, and so on, where a device employing the XR technology may be called an XR device.

Hereinafter, 5G communication (5th generation mobile communication) required by an apparatus requiring AI processed information and/or an AI processor will be described through paragraphs A through G.

A. Example of Block Diagram of UE and 5G Network

Figure 2:
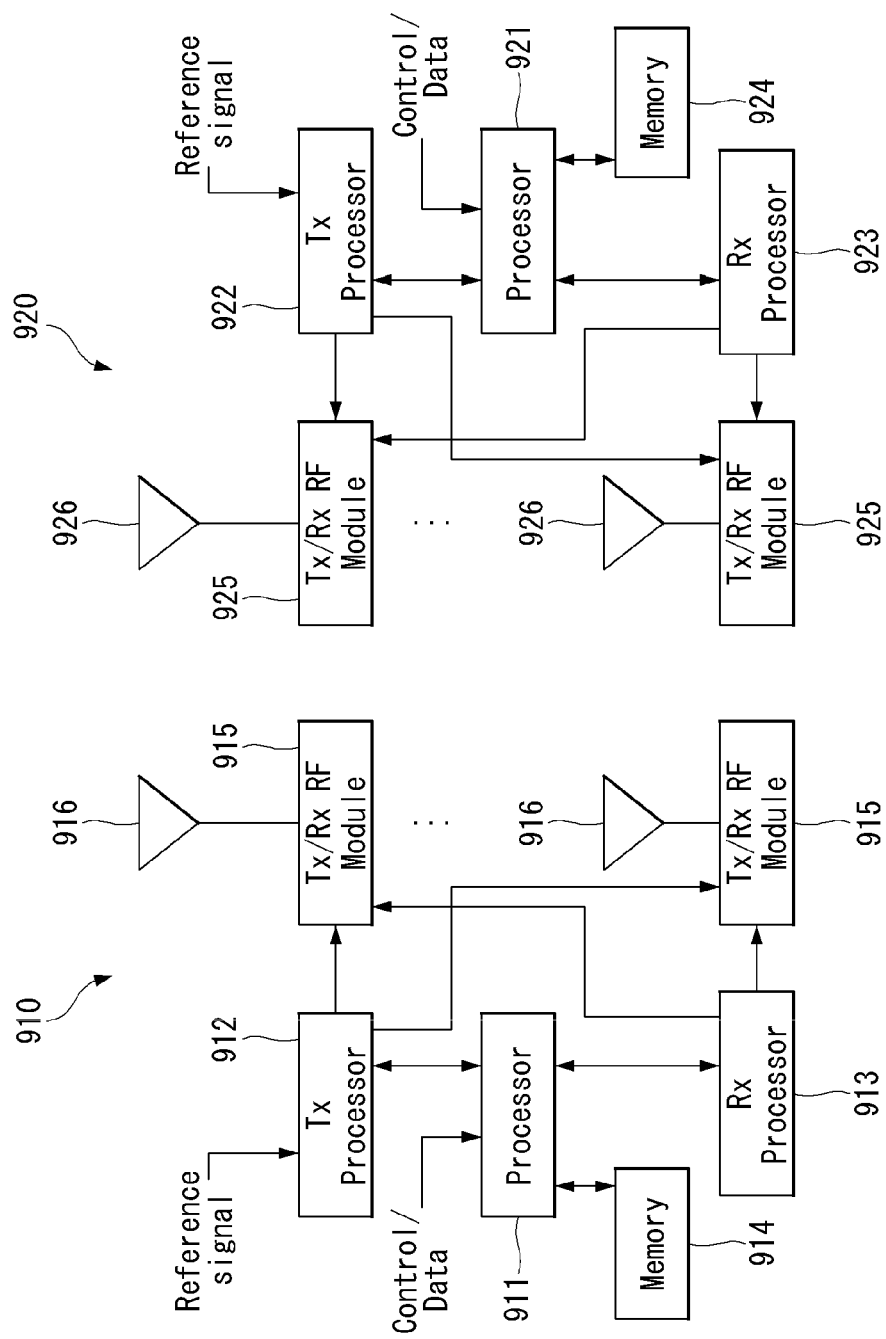
FIG. 2 is a block diagram of a wireless communication system to which methods proposed in the disclosure are applicable.

FIG. 2 is a block diagram of a wireless communication system to which methods proposed in the disclosure are applicable.

Referring to FIG. 2, a device (autonomous device) including an autonomous module is defined as a first communication device (910 of FIG. 2), and a processor 911 can perform detailed autonomous operations.

A 5G network including another vehicle communicating with the autonomous device is defined as a second communication device (920 of FIG. 2), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 2, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 3:
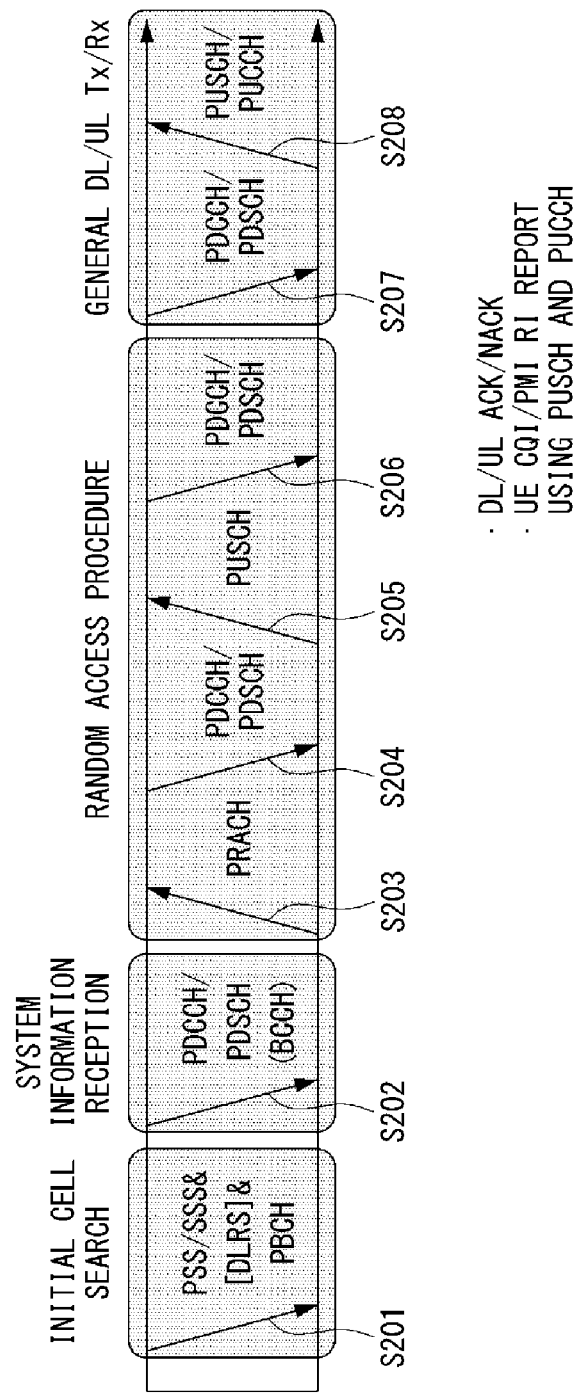
FIG. 3 is a diagram showing an example of a signal transmission/reception method in a wireless communication system.

FIG. 3 is a diagram showing an example of a signal transmission/reception method in a wireless communication system.

Referring to FIG. 3, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 3.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SIBx is included in an SI message and transmitted over a PDSCH. Each SI message is transmitted within a periodically generated time window (i.e., SI-window).

A random access (RA) procedure in a 5G communication system will be additionally described with reference to FIG. 3.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

A UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

A UE receives a CSI-ResourceConfig IE including CSI-SSB-ResourceSetList for SSB resources used for BM from a BS. The RRC parameter "csi-SSB-Resource-SetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.

The UE receives the signals on SSB resources from the BS on the basis of the CSI-SSB-ResourceSetList.

When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

The UE receives an NZP CSI-RS resource set IE including an RRC parameter with respect to 'repetition' from a BS through RRC signaling. Here, the RRC parameter 'repetition' is set to 'ON'.

The UE repeatedly receives signals on resources in a CSI-RS resource set in which the RRC parameter 'repetition' is set to 'ON' in different OFDM symbols through the same Tx beam (or DL spatial domain transmission filters) of the BS.

The UE determines an RX beam thereof.

The UE skips a CSI report. That is, the UE can skip a CSI report when the RRC parameter 'repetition' is set to 'ON'.

Next, the Tx beam determination procedure of a BS will be described.

A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by serving-CellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation Between Autonomous Vehicles Using 5G Communication

Figure 4:
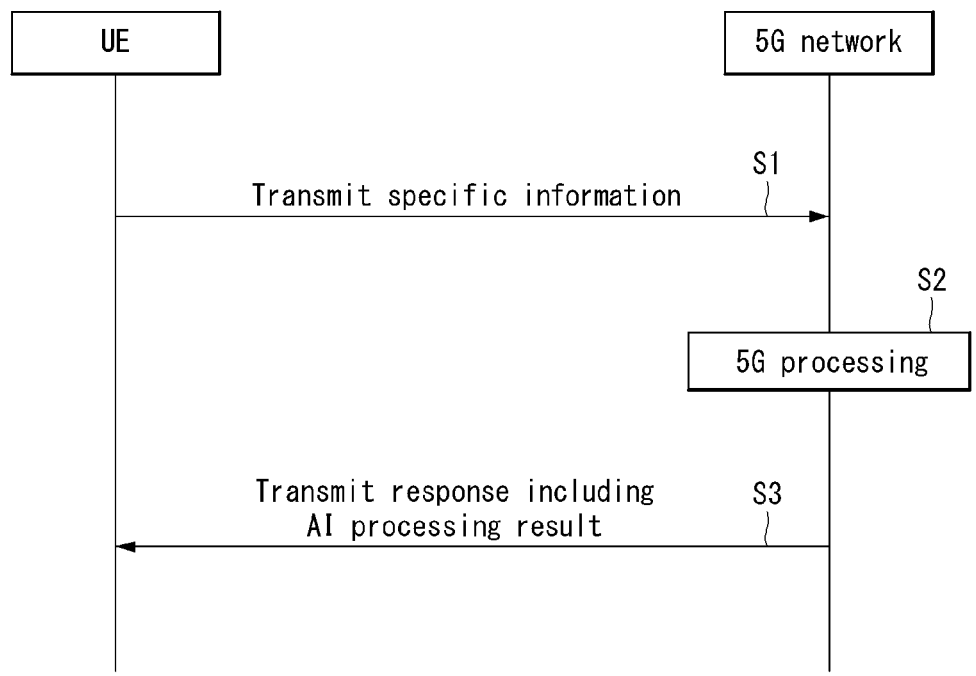
FIG. 4 shows an example of basic operations of an autonomous vehicle and a 5G network in a 5G communication system.

FIG. 4 shows an example of basic operations of an autonomous vehicle and a 5G network in a 5G communication system.

The autonomous vehicle transmits specific information to the 5G network (S1). The specific information may include autonomous driving related information. In addition, the 5G network can determine whether to remotely control the vehicle (S2). Here, the 5G network may include a server or a module which performs remote control related to autonomous driving. In addition, the 5G network can transmit information (or signal) related to remote control to the autonomous vehicle (S3).

G. Applied operations between autonomous vehicle and 5G network in 5G communication system Hereinafter, the operation of an autonomous vehicle using 5G communication will be described in more detail with reference to wireless communication technology (BM procedure, URLLC, mMTC, etc.) described in FIGS. 2 and 3.

First, a basic procedure of an applied operation to which a method proposed by the present disclosure which will be described later and eMBB of 5G communication are applied will be described.

As in steps S1 and S3 of FIG. 4, the autonomous vehicle performs an initial access procedure and a random access procedure with the 5G network prior to step S1 of FIG. 4 in order to transmit/receive signals, information and the like to/from the 5G network.

More specifically, the autonomous vehicle performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the autonomous vehicle receives a signal from the 5G network.

In addition, the autonomous vehicle performs a random access procedure with the 5G network for UL synchronization acquisition and/or UL transmission. The 5G network can transmit, to the autonomous vehicle, a UL grant for scheduling transmission of specific information. Accordingly, the autonomous vehicle transmits the specific information to the 5G network on the basis of the UL grant. In addition, the 5G network transmits, to the autonomous vehicle, a DL grant for scheduling transmission of 5G processing results with respect to the specific information. Accordingly, the 5G network can transmit, to the autonomous vehicle, information (or a signal) related to remote control on the basis of the DL grant.

Next, a basic procedure of an applied operation to which a method proposed by the present disclosure which will be described later and URLLC of 5G communication are applied will be described.

As described above, an autonomous vehicle can receive DownlinkPreemption IE from the 5G network after the autonomous vehicle performs an initial access procedure and/or a random access procedure with the 5G network. Then, the autonomous vehicle receives DCI format 2_1 including a preemption indication from the 5G network on the basis of DownlinkPreemption IE. The autonomous vehicle does not perform (or expect or assume) reception of eMBB data in resources (PRBs and/or OFDM symbols) indicated by the preemption indication. Thereafter, when the autonomous vehicle needs to transmit specific information, the autonomous vehicle can receive a UL grant from the 5G network.

Next, a basic procedure of an applied operation to which a method proposed by the present disclosure which will be described later and mMTC of 5G communication are applied will be described.

Description will focus on parts in the steps of FIG. 4 which are changed according to application of mMTC.

In step S1 of FIG. 4, the autonomous vehicle receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the autonomous vehicle transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present disclosure which will be described later and applied or can complement the methods proposed in the present disclosure to make technical features of the methods concrete and clear.

Figure 5:
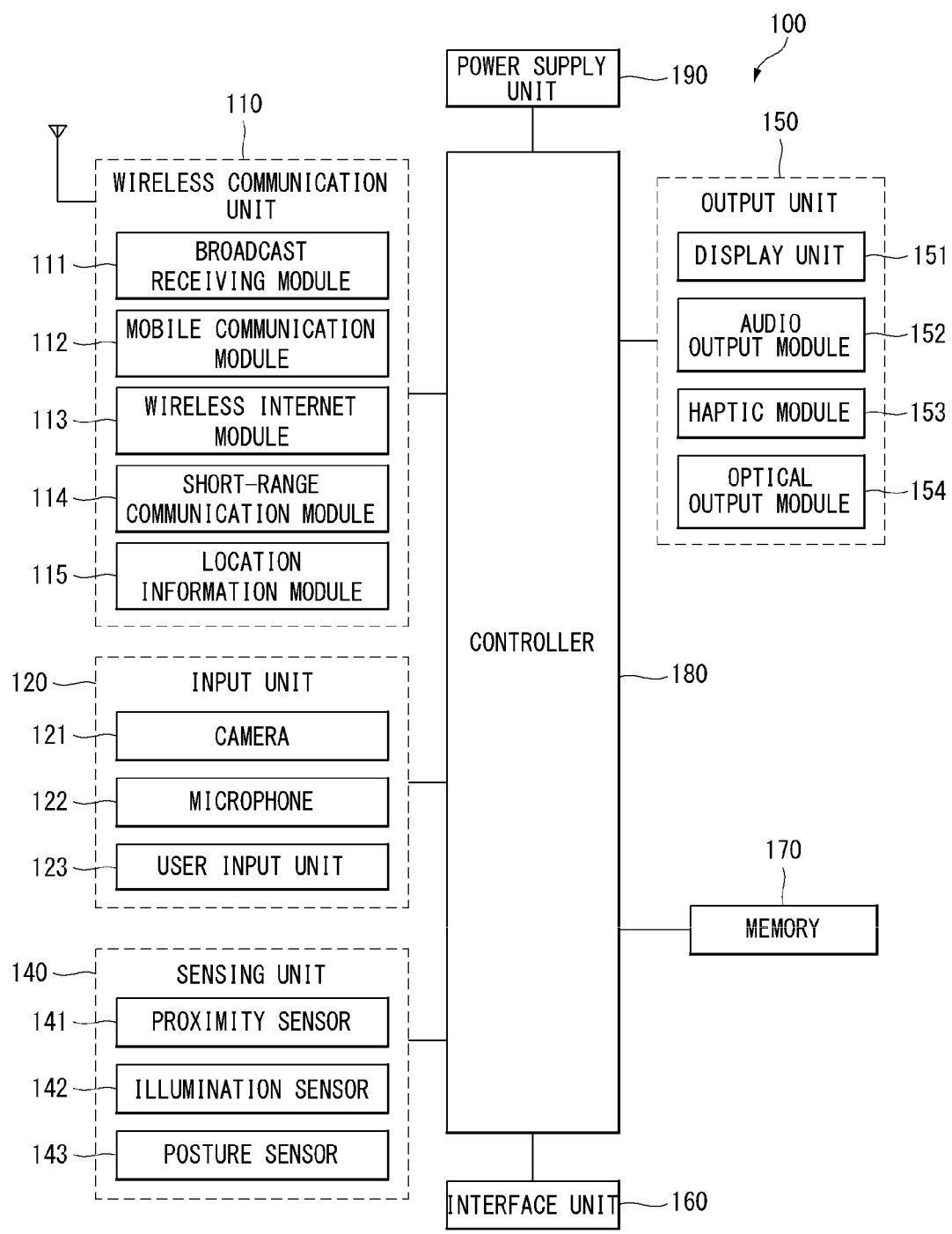
FIG. 5 is a block diagram illustrating a mobile terminal related to the present disclosure.
Figure 6:
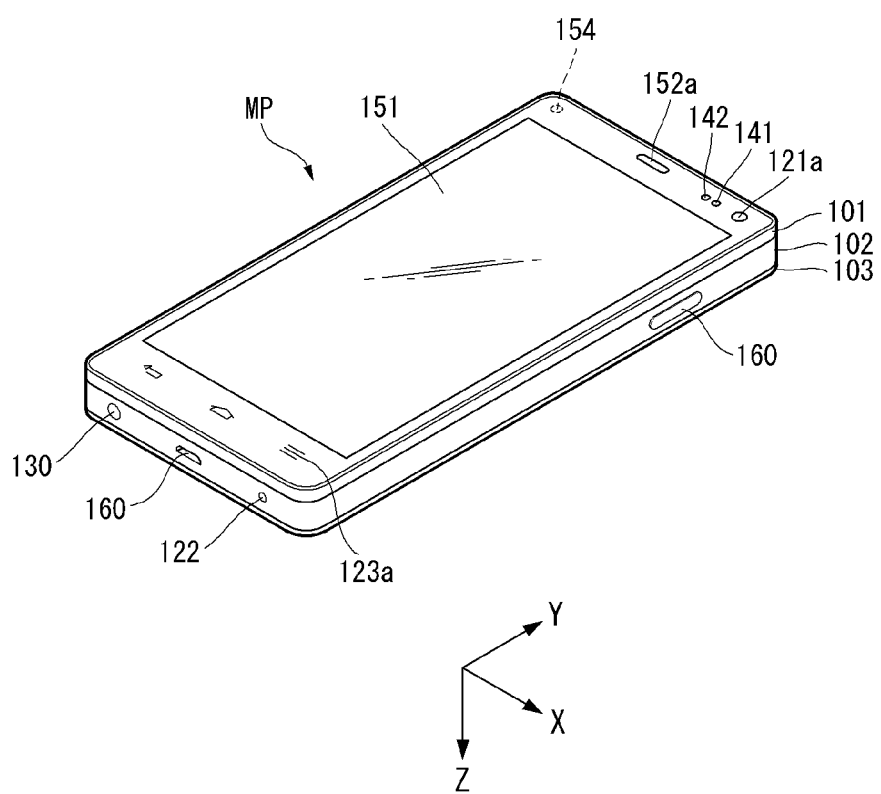
FIGS. 6 and 7 are conceptual views of a mobile terminal related to the present disclosure when viewed from different directions
Figure 7:
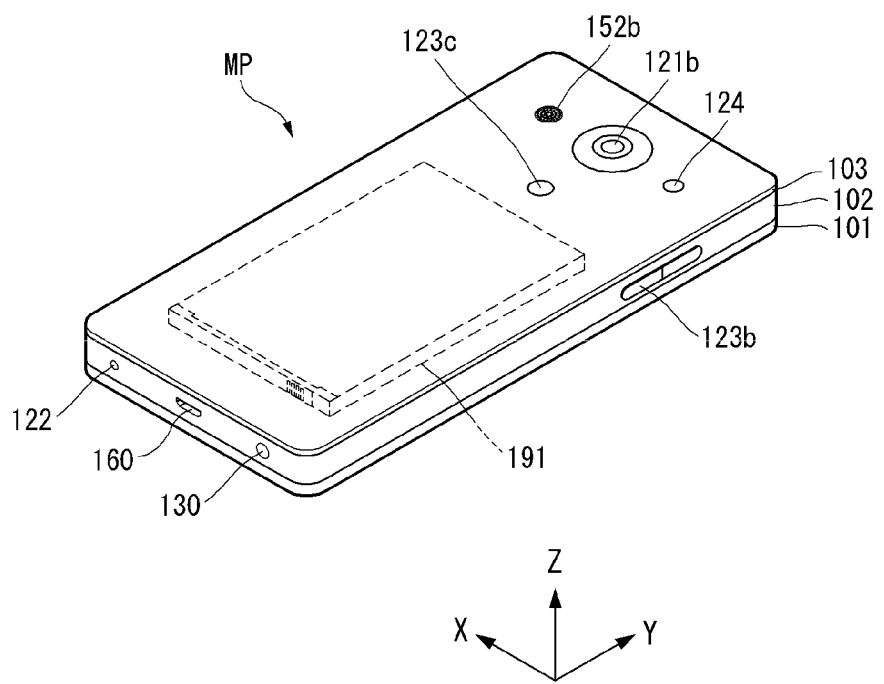

FIG. 5 is a block diagram illustrating a mobile terminal related to the present disclosure. FIGS. 6 and 7 are conceptual views of a mobile terminal related to the present disclosure when viewed from different directions.

Referring to FIGS. 5, 6 and 7, a mobile terminal MP may include a wireless communication unit 110, an input unit 120, a sensing unit 140, an output unit 150, an interface unit 160, a memory 170, a controller 180, and a power supply unit 190, and the like. It is understood that all the components illustrated in FIG. 5 is not requirements to implement the mobile terminal, and that more or fewer components may be alternatively implemented.

More specifically, the wireless communication unit 110 may include one or more modules which permit wireless communications between the mobile terminal MP and a wireless communication system, between the mobile terminal MP and another mobile terminal MP, or between the mobile terminal MP and an external server. Further, the wireless communication unit 110 may include one or more modules which connect the mobile terminal MP to one or more 5G networks.

The wireless communication unit 110 may include at least one of a broadcast receiving module 111, a mobile communication module 112, a wireless Internet module 113, a short-range communication module 114, or a location information module 115.

The input unit 120 may include a camera 121 which is one type of an image input unit for inputting an image signal, a microphone 122 which is one type of an audio input unit for inputting an audio signal, and a user input unit 123 (e.g., touch key, push key, etc.) for allowing a user to input information. Audio data or image data obtained by the input unit 120 may be analyzed and processed by user control commands.

The sensing unit 140 may include one or more sensors for sensing at least one of internal information of the mobile terminal, information about a surrounding environment of the mobile terminal, and user information. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., camera 121), the microphone 122, a battery gauge, an environment sensor (e.g., a barometer, a hygrometer, a thermometer, a radiation detection sensor, a thermal sensor, a gas sensor, etc.), and a chemical sensor (e.g., an electronic nose, a health care sensor, a biometric sensor, etc.). The mobile terminal disclosed in the present specification may be configured to combine and utilize information obtained from two or more sensors of the sensing unit 140.

The output unit 150 may be configured to output various types of information, such as audio, video, tactile output, and the like. The output unit 150 may include at least one of a display unit 151, an audio output unit 152, a haptic module 153, or an optical output unit 154. The display unit 151 may have an inter-layered structure or an integrated structure with a touch sensor to implement a touch screen. The touch screen may provide an output interface between the mobile terminal MP and the user, as well as function as the user input unit 123 which provides an input interface between the mobile terminal MP and the user.

The interface unit 160 serves as an interface with various types of external devices that can be coupled to the mobile terminal MP. The interface unit 160 may include at least one of wired/wireless headset ports, external power supply ports, wired/wireless data ports, memory card ports, ports for connecting a device having an identification module, audio input/output (I/O) ports, video I/O ports, or earphone ports. The mobile terminal MP may perform assorted control functions associated with a connected external device, in response to the external device being connected to the interface unit 160.

The memory 170 stores data to support various functions of the mobile terminal MP. For instance, the memory 170 may be configured to store multiple application programs or applications executed in the mobile terminal MP, data or instructions for operations of the mobile terminal MP, and the like. At least some of these application programs may be downloaded from an external server via wireless communication. Other application programs may be installed within the mobile terminal MP at time of manufacturing or shipping, which is typically the case for basic functions (e.g., receiving a call, placing a call, receiving a message, sending a message, and the like) of the mobile terminal MP. The application programs may be stored in the memory 170, installed in the mobile terminal MP, and executed by the controller 180 to perform an operation (or function) for the mobile terminal MP.

The controller 180 typically functions to control overall operation of the mobile terminal MP, in addition to the operations associated with the application programs. The controller 180 may provide or process suitable information or functions appropriate for the user by processing signals, data, information and the like, which are input or output by the components mentioned above, or activating application programs stored in the memory 170.

The controller 180 may control at least some of the components illustrated in FIG. 5 in order to execute an application program that have been stored in the memory 170. In addition, the controller 180 may combine and operate at least two of the components included in the mobile terminal MP for the execution of the application program.

The power supply unit 190 is configured to receive external power or provide internal power and supply power to the respective components included in the mobile terminal MP under the control of the controller 180. The power supply unit 190 may include a battery, and the battery may be configured to be embedded in the device body, or configured to be detachable from the device body.

At least some of the above components may be combined with one another and operate, in order to implement an operation, a control, or a control method of a mobile terminal according to various embodiments described below. Further, the operation, the control, or the control method of the mobile terminal according to various embodiments may be implemented on the mobile terminal by an activation of at least one application program stored in the memory 170.

Referring to FIGS. 6 and 7, the mobile terminal MP includes a bar-shaped terminal body. However, the present disclosure is not limited thereto and may implement the mobile terminal MP in any of a variety of different configurations. Examples of such configurations include watch-type, clip-type, glasses-type, or folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

Here, the terminal body may be understood as a concept of referring to the mobile terminal MP by considering the mobile terminal as at least one aggregate.

The mobile terminal MP includes a case (e.g., frame, housing, cover, etc.) forming an appearance of the terminal. As illustrated, the mobile terminal MP may include a front case 101 and a rear case 102. Various electronic components are incorporated in an inner space formed by coupling the front case 101 and the rear case 102. At least one middle case may be additionally positioned between the front case 101 and the rear case 102.

The display unit 151 may be located on a front surface of the terminal body to output information. As illustrated, a window 151a of the display unit 151 may be mounted on the front case 101 to form the front surface of the terminal body together with the front case 101.

In some embodiments, electronic components may also be mounted on the rear case 102. Examples of such electronic components mounted on the rear case 102 include a detachable battery, an identification module, a memory card, and the like. In this case, a rear cover 103 covering the electronic components may be detachably coupled to the rear case 102. Therefore, when the rear cover 103 is detached from the rear case 102, the electronic components mounted on the rear case 102 are externally exposed.

As illustrated, when the rear cover 103 is coupled to the rear case 102, a portion of a side surface of the rear case 102 may be exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, and 103 may be formed by injection-molding a synthetic resin or may be formed of a metal, for example, stainless steel (STS), aluminum (Al), titanium (Ti), or the like.

As an alternative to the example in which the plurality of cases form an inner space for accommodating the various electronic components, the mobile terminal MP may be configured such that one case forms the inner space. In this example, a mobile terminal MP having a uni-body is formed in such a manner that synthetic resin or metal extends from a side surface to a rear surface.

The mobile terminal MP may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103 to hermetically seal an inner space when those cases are coupled.

The mobile terminal MP may include the display unit 151, first and second audio output units 152a and 152b, the proximity sensor 141, the illumination sensor 142, the optical output module 154, first and second cameras 121a and 121b, first to third manipulation units 123a, 123b, and 123c, the microphone 122, the interface unit 160, an earphone jack 130, and the like.

Hereinafter, as illustrated in FIGS. 6 and 7, as an example, the mobile terminal MP is shown configured such that the display unit 151, the first audio output unit 152a, the proximity sensor 141, the illumination sensor 142, the optical output module 154, the first camera 121a, and the first manipulation unit 123*a* are disposed on the front surface of the terminal body, the second manipulation unit 123*b*, the microphone 122, the earphone jack 130, and the interface unit 160 are disposed on the side surface of the terminal body, and the second audio output unit 152*b*, the third manipulation unit 123*c*, and the second camera 121*b* are disposed on the rear surface of the terminal body.

However, these components are not limited to these arrangements. In some embodiments, some components may be excluded or replaced, or may be disposed on other surface. For example, the first manipulation unit 123*a* may not be disposed on the front surface of the terminal body, and the second audio output unit 152*b* may be disposed on the side surface of the terminal body not the rear surface of the terminal body.

The display unit 151 displays (outputs) information processed in the mobile terminal MP. For example, the display unit 151 may display execution screen information of an application program running in the mobile terminal MP, or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED) display, a flexible display, a three-dimensional (3D) display, or an e-ink display.

The display unit 151 may be implemented using two or more display units according to the implementation type of the mobile terminal MP. In this instance, a plurality of the display units may be disposed on one surface of the mobile terminal MP to be either spaced apart from each other or integrated, or the display units may be respectively disposed on different surfaces of the mobile terminal MP.

The display unit 151 may also include a touch sensor which senses a touch input received at the display unit 151 in order to receive a control command using a touching manner. If a touch is input to the display unit 151, the touch sensor may be configured to sense the touch, and the controller 180 may be configured to generate a control command corresponding to the touch. The content which is input in the touching manner may be a text or numerical value, or a menu item which can be indicated or designated in various modes.

The touch sensor may be formed in a film type having a touch pattern and disposed between the window 151*a* and a display (not shown) on a rear surface of the window 151*a*, or may be a metal wire which is patterned directly on the rear surface of the window 151*a*. Alternatively, the touch sensor may be integrally formed with the display. For example, the touch sensor may be disposed on a substrate of the display or within the display.

As described above, the display unit 151 may also form a touch screen together with the touch sensor. In this case, the touch screen may serve as the user input unit 123 (see FIG. 5). In some cases, the touch screen may replace at least a part of function of the first manipulation unit 123*a*.

The first audio output module 152*a* may be implemented as a receiver which transmits a call sound to user's ears, and the second audio output module 152*b* may be implemented in the form of a loud speaker to output various alarm sounds or multimedia reproduction sounds.

The window 151*a* of the display unit 151 may include an audio hole which permits audio generated by the first audio output module 152*a* to pass. However, the present disclosure is not limited thereto, and one alternative is to allow audio to be released along an assembly gap between structural bodies (for example, a gap between the window 151*a* and the front case 101). In this case, a hole independently formed to output audio sounds may be invisible or is otherwise hidden in terms of appearance, thereby further simplifying the appearance and manufacturing of the mobile terminal MP.

The optical output unit 154 is configured to output light for indicating that an event has occurred. Examples of the events include a message reception, a call signal reception, a missed call, an alarm, a schedule notice, an email reception, information reception through an application, and the like. When a user has checked a generated event, the controller 180 may control the optical output unit 154 to stop the light output.

The first camera 121*a* processes image frames of as a still image or a moving image obtained by an image sensor in a capture mode or a video call mode. The processed image frames may then be displayed on the display unit 151 or stored in the memory 170.

The first to third manipulation units 123*a*, 123*b* and 123*b* are examples of the user input unit 123, which is manipulated by a user to provide an input to the mobile terminal MP, and may also be referred commonly to as a manipulating portion. The first to third manipulation units 123*a*, 123*b* and 123*b* may employ any tactile method that allows the user to perform manipulation, such as touch, push, scroll, or the like. The first and second manipulation units 123*a* and 123*b* may also employ any non-tactile method that allows the user to perform manipulation such as proximity touch, hovering touch, or the like. The third manipulation unit 123*c* includes a finger scan sensor and can obtain user's fingerprint. The obtained fingerprint may be provided to the controller 180.

This figure illustrates the first manipulation unit 123*a* as a touch key, but the present disclosure is not limited thereto. For example, possible alternatives of the first manipulation unit 123*a* include a mechanical key, a push key, a touch key, and combinations thereof.

Input received at the first and second manipulation units 123*a* and 123*b* may be set in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output unit 152*a* or 152*b*, to switch to a touch recognition mode of the display unit 151, or the like.

As another example of the user input unit 123, the third manipulation unit 123*c* may be located on the rear surface of the terminal body. The third manipulation unit 123*c* may be manipulated by a user to provide input to the mobile terminal MP. The input may be set in a variety ways.

For example, the third manipulation unit 123*c* may be used by the user to provide an input for power on/off, start, end, scroll, control volume level being output from the first and second audio output units 152*a* and 152*b*, switch to a touch recognition mode of the display unit 151, fingerprint information acquisition, and the like. The rear input unit may be configured to permit a touch input, a push input, or combinations thereof.

The rear input unit may be located to overlap the display unit 151 of the front side in a thickness direction of the terminal body. As an example, the rear input unit may be located on an upper end portion of the rear side of the terminal body such that the user can easily manipulate it using a forefinger when the user grabs the terminal body with one hand. However, the present disclosure is not limited thereto. Alternatively, a position of the rear input unit may be changed.

If the rear input unit is positioned on the rear surface of the terminal body as described above, a new type of user interface using the rear input unit can be implemented. If the first manipulation unit 123a is omitted from the front surface of the terminal body by replacing at least some functions of the first manipulation unit 123a on the front surface of the terminal body by the touch screen or the rear input unit described above, the display unit 151 can have a larger screen.

As a further alternative, the mobile terminal MP may include a finger scan sensor which scans a user's fingerprint. The controller 180 can use fingerprint information sensed by the finger scan sensor as an authentication procedure. The finger scan sensor may also be embedded in the display unit 151 or the user input unit 123.

The microphone 122 is configured to receive user's voice, other sounds, and the like. The microphone 122 may be implemented using a plurality of microphones and configured to receive stereo sounds.

The interface unit 160 serves as a path allowing the mobile terminal MP to interface with external devices. For example, the interface unit 160 may include at least one of a connection terminal for connecting to another device (e.g., an earphone, an external speaker, etc.), a port for short-range communication (e.g., an infrared data association (IrDA) port, a Bluetooth port, a wireless LAN port, etc.), or a power supply terminal for supplying power to the mobile terminal MP. The interface unit 160 may be implemented in the form of a socket for accommodating an external card, such as subscriber identification module (SIM), user identity module (UIM), or a memory card for information storage.

The second camera 121b may be located at the rear surface of the terminal body. In this instance, the second camera 121b has an image capturing direction that is substantially opposite to an image capturing direction of the first camera unit 121a.

The second camera 121b may include a plurality of lenses arranged along at least one line. The plurality of lenses may also be arranged in a matrix form. The cameras may be referred to as an "array camera." When the second camera 121b is implemented as an array camera, the second camera 121b can take images using the plurality of lenses in various manners and thus can obtain the images with better quality.

A flash 124 may be positioned adjacent to the second camera 121b. When a subject is taken with the second camera 121b, the flash 124 illuminates the subject.

The second audio output module 152b may be additionally located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be embedded in the terminal body or formed at the case. For example, the antenna which forms a part of the broadcast receiving module 111 (see FIG. 5) may be configured to be retractable into the terminal body. Alternatively, the antenna may be formed in a film type and attached to an inner surface of the rear cover 103, or may be replaced by a case including a conductive material.

The power supply unit 190 (see FIG. 5) for supplying power to the mobile terminal MP is located at the terminal body. The power supply unit 190 may include a battery 191 that is embedded in the terminal body and is detachably configured to the outside of the terminal body.

The battery 191 may be configured to receive power via a power cable connected to the interface unit 160. The battery 191 may also be configured to be charged using a wireless charger. The wireless charging may be implemented by a magnetic induction method or a resonance method (electromagnetic resonance method).

This figure illustrates that the rear cover 103 is configured to couple to the rear case 102 for covering the battery 191 to thereby prevent the separation of the battery 191 and to protect the battery 191 from an external impact or foreign material, by way of example. When the battery 191 is detachable from the terminal body, the rear cover 103 may be detachably coupled to the rear case 102.

An accessory for protecting an appearance or assisting or extending the functions of the mobile terminal MP may be additionally provided to the mobile terminal MP. Examples of the accessory may include a cover or a pouch for covering or accommodating at least one surface of the mobile terminal MP. The cover or the pouch may be configured to cooperate with the display unit 151 and extend the function of the mobile terminal MP. Another example of the accessory may include a touch pen for assisting or extending a touch input to a touch screen.

Figure 8:
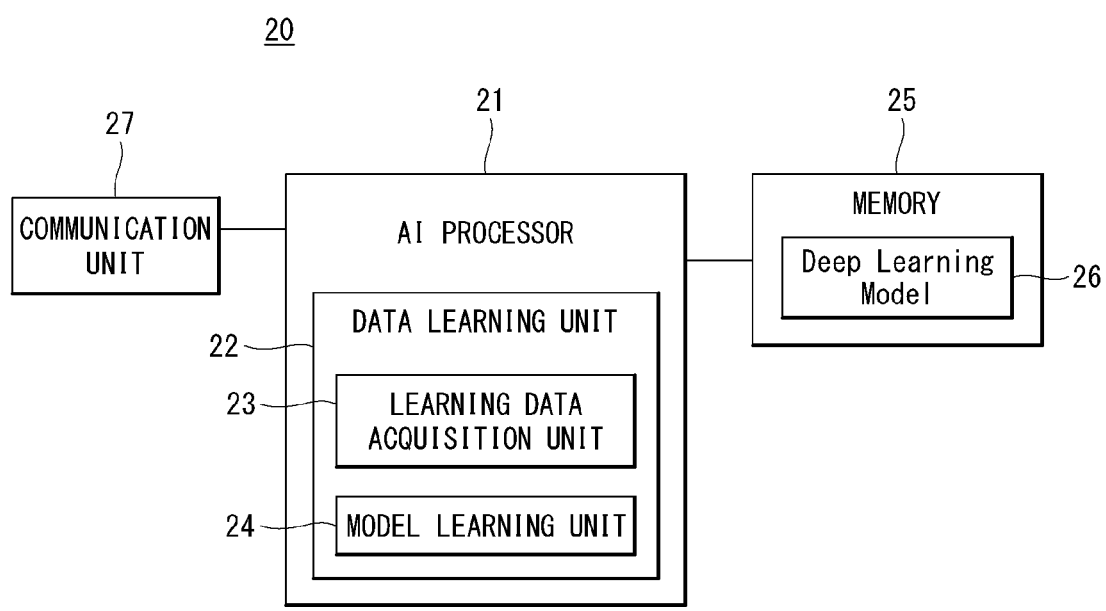
FIG. 8 is a block diagram of an AI device in accordance with the embodiment of the present disclosure.

FIG. 8 is a block diagram of an AI device in accordance with the embodiment of the present disclosure.

The AI device 20 may include electronic equipment that includes an AI module to perform AI processing or a server that includes the AI module. Furthermore, the AI device 20 may be included in at least a portion of the intelligent device 100 illustrated in FIG. 7, and may be provided to perform at least some of the AI processing.

The AI processing may include all operations related to the function of the intelligent device 100 illustrated in FIG. 4. For example, the intelligent robot cleaner may AI-process sensing data or travel data to perform processing/determining and a control-signal generating operation. Furthermore, for example, the intelligent robot cleaner may AI-process data acquired through interaction with other electronic equipment provided in the intelligent robot cleaner to control sensing.

The AI device 20 may include an AI processor 21, a memory 25 and/or a communication unit 27.

The AI device 20 may be a computing device capable of learning a neural network, and may be implemented as various electronic devices such as a server, a desktop PC, a laptop PC or a tablet PC.

The AI processor 21 may learn the neural network using a program stored in the memory 25. Particularly, the AI processor 21 may learn the neural network for recognizing data related to the intelligent device 100. Here, the neural network for recognizing data related to the intelligent device 100 may be designed to simulate a human brain structure on the computer, and may include a plurality of network nodes having weights that simulate the neurons of the human neural network. The plurality of network nodes may exchange data according to the connecting relationship to simulate the synaptic action of neurons in which the neurons exchange signals through synapses. Here, the neural network may include the deep learning model developed from the neural network model. While the plurality of network nodes is located at different layers in the deep learning model, the nodes may exchange data according to the convolution connecting relationship. Examples of the neural network model include various deep learning techniques, such as a deep neural network (DNN), a convolution neural network (CNN), a recurrent neural network (RNN, Recurrent Boltzmann Machine), a restricted Boltzmann machine (RBM), a deep belief network (DBN) or a deep Q-Network, and may be applied to fields such as computer vision, voice recognition, natural language processing, voice/signal processing or the like.

Meanwhile, the processor performing the above-described function may be a general-purpose processor (e.g. CPU), but may be an AI dedicated processor (e.g. GPU) for artificial intelligence learning.

The memory 25 may store various programs and data required to operate the AI device 20. The memory 25 may be implemented as a non-volatile memory, a volatile memory, a flash memory), a hard disk drive (HDD) or a solid state drive (SDD). The memory 25 may be accessed by the AI processor 21, and reading/writing/correcting/deleting/update of data by the AI processor 21 may be performed.

Furthermore, the memory 25 may store the neural network model (e.g. the deep learning model 26) generated through a learning algorithm for classifying/recognizing data in accordance with the embodiment of the present disclosure.

The AI processor 21 may include a data learning unit 22 which learns the neural network for data classification/recognition. The data learning unit 22 may learn a criterion about what learning data is used to determine the data classification/recognition and about how to classify and recognize data using the learning data. The data learning unit 22 may learn the deep learning model by acquiring the learning data that is used for learning and applying the acquired learning data to the deep learning model.

The data learning unit 22 may be made in the form of at least one hardware chip and may be mounted on the AI device 20. For example, the data learning unit 22 may be made in the form of a dedicated hardware chip for the artificial intelligence AI, and may be made as a portion of the general-purpose processor (CPU) or the graphic dedicated processor (GPU) to be mounted on the AI device 20. Furthermore, the data learning unit 22 may be implemented as a software module. When the data learning unit is implemented as the software module (or a program module including instructions), the software module may be stored in a non-transitory computer readable medium. In this case, at least one software module may be provided by an operating system (OS) or an application.

The data learning unit 22 may include the learning-data acquisition unit 23 and the model learning unit 24.

The learning-data acquisition unit 23 may acquire the learning data needed for the neural network model for classifying and recognizing the data. For example, the learning-data acquisition unit 23 may acquire vehicle data and/or sample data which are to be inputted into the neural network model, as the learning data.

The model learning unit 24 may learn to have a determination criterion about how the neural network model classifies predetermined data, using the acquired learning data. The model learning unit 24 may learn the neural network model, through supervised learning using at least some of the learning data as the determination criterion. Alternatively, the model learning unit 24 may learn the neural network model through unsupervised learning that finds the determination criterion, by learning by itself using the learning data without supervision. Furthermore, the model learning unit 24 may learn the neural network model through reinforcement learning using feedback on whether the result of situation determination according to the learning is correct. Furthermore, the model learning unit 24 may learn the neural network model using the learning algorithm including error back-propagation or gradient descent.

If the neural network model is learned, the model learning unit 24 may store the learned neural network model in the memory. The model learning unit 24 may store the learned neural network model in the memory of the server connected to the AI device 20 with a wire or wireless network.

The data learning unit 22 may further include a learning-data preprocessing unit (not shown) and a learning-data selection unit (not shown) to improve the analysis result of the recognition model or to save resources or time required for generating the recognition model.

The learning-data preprocessing unit may preprocess the acquired data so that the acquired data may be used for learning for situation determination. For example, the learning-data preprocessing unit may process the acquired data in a preset format so that the model learning unit 24 may use the acquired learning data for learning for image recognition.

Furthermore, the learning-data selection unit may select the data required for learning among the learning data acquired by the learning-data acquisition unit 23 or the learning data preprocessed in the preprocessing unit. The selected learning data may be provided to the model learning unit 24. For example, the learning-data selection unit may select only data on the object included in a specific region as the learning data, by detecting the specific region in the image acquired by the camera of the intelligent device 100.

Furthermore, the data learning unit 22 may further include a model evaluation unit (not shown) to improve the analysis result of the neural network model.

When the model evaluation unit inputs evaluated data into the neural network model and the analysis result outputted from the evaluated data does not satisfy a predetermined criterion, the model learning unit 22 may learn again. In this case, the evaluated data may be predefined data for evaluating the recognition model. By way of example, the model evaluation unit may evaluate that the predetermined criterion is not satisfied when the number or ratio of the evaluated data in which the analysis result is inaccurate among the analysis result of the learned recognition model for the evaluated data exceeds a preset threshold.

The communication unit 27 may transmit the AI processing result by the AI processor 21 to the external electronic equipment.

Here, the external electronic equipment may be defined as the intelligent device 100. Furthermore, the AI device 20 may be defined as another intelligent device 100 or a 5G network that communicates with the intelligent device 100. Meanwhile, the AI device 20 may be implemented by being functionally embedded in an autonomous driving module provided in the intelligent device 100. Furthermore, the 5G network may include a server or a module that performs related control of the intelligent device 100.

Although the AI device 20 illustrated in FIG. 8 is functionally divided into the AI processor 21, the memory 25, the communication unit 27 and the like, it is to be noted that the above-described components are integrated into one module, which is referred to as an AI module.

Figure 9:
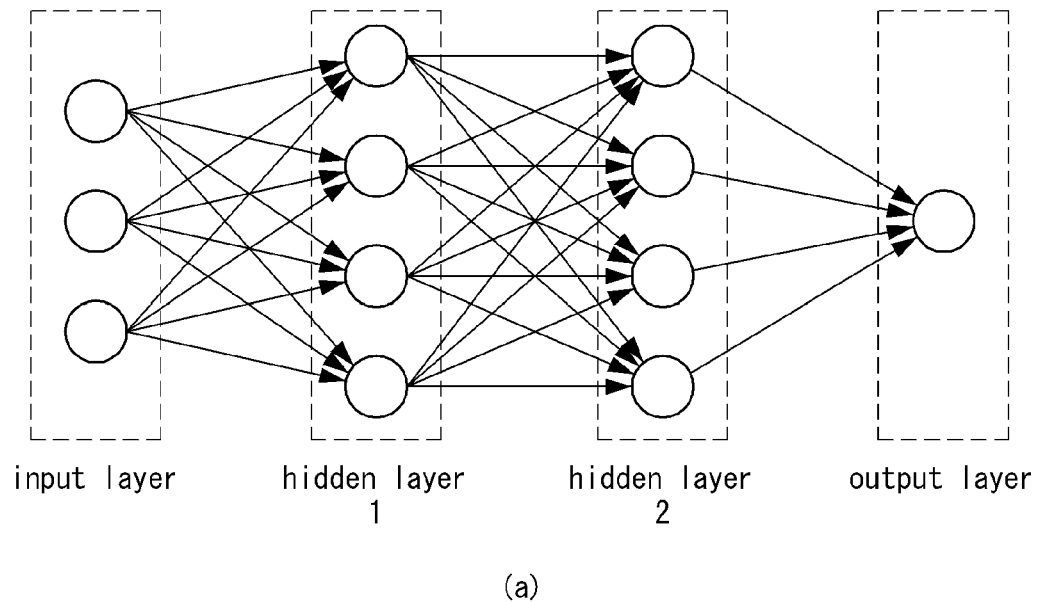
FIG. 9 illustrates an example of an artificial neural network model related to the present disclosure.
Figure 9:
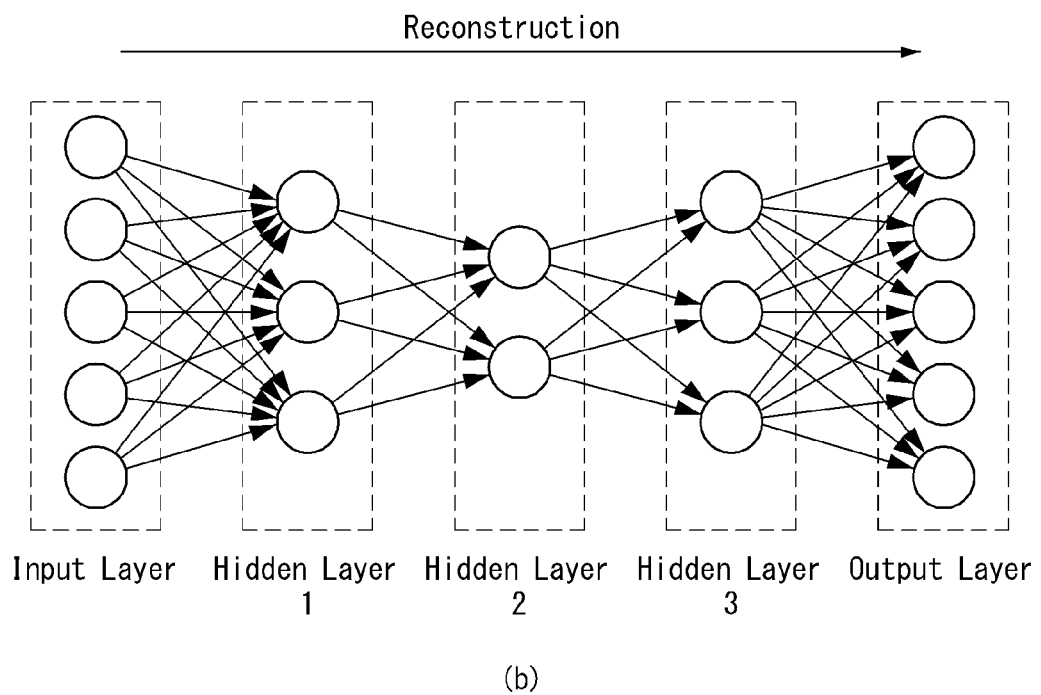

FIG. 9 illustrates an example of an artificial neural network model related to the present disclosure.

More specifically, FIG. 9(a) illustrates a general structure of the artificial neural network model, and FIG. 9(b) illustrates an autoencoder, that performs decoding after encoding and goes through a reconstruction step, among the artificial neural network model.

The artificial neural network model may generally include an input layer, a hidden layer, and an output layer, and neurons included in each layer may be connected through weight values. The artificial neural network model may be configured to approximate a complex function through a linear combination and a nonlinear activation function of the weight values and neuron values. The purpose of learning the artificial neural network model is to find a weight value for minimizing a difference between an output calculated at the output layer and a real output.

A deep neural network may mean an artificial neural network model consisting of several hidden layers between the input layer and the output layer. A neural network structure, in which complex nonlinear relationships can be modeled by using many hidden layers, and advanced abstraction is possible by increasing the number of layers as described above, is referred to as deep learning. The deep learning learns a very large amount of data and thus can choose probably the highest answer based on a result of learning if new data is input. Thus, the deep learning can operate adaptively based on the input and can automatically find feature factors in a process of learning a model based on data.

A deep learning based model may include various deep learning techniques such as deep neural networks (DNN), convolutional deep neural networks (CNN), recurrent Boltzmann machine (RNN), restricted Boltzmann machine (RBM), deep belief networks (DBN), and deep Q-network described above with reference to FIG. 8, but is not limited thereto. Further, a machine learning method may be used in addition to the deep learning. For example, when features of input data are extracted by applying the deep learning based model, and input data is classified or recognized based on the extracted features, a machine learning based model can be applied. The machine learning based model may include support vector machine (SVM), AdaBoost, and the like, but is not limited thereto.

Referring to FIG. 9(*a*), an artificial neural network model according to an embodiment of the present disclosure may include an input layer, a hidden layer, an output layer, and a weight value. For example, FIG. 9(*a*) illustrates a structure of an artificial neural network model in which a size of an input layer is 3, a size of each of first and second hidden layers is 4, and a size of an output layer is 1. In this instance, neurons included in the hidden layer may be connected to neurons included in the input layer through a linear combination with an individual weight value included in the weight value. Neurons included in the output layer may be connected to neurons included in the hidden layer through a linear combination with an individual weight value included in the weight value. The artificial neural network model can derive a model for minimizing a difference between an output calculated at the output layer and a real output.

Referring to FIG. 9(*b*), an artificial neural network model according to an embodiment of the present disclosure may include an autoencoder. If the autoencoder inputs original data to the artificial neural network model, encodes the input data, and decodes the encoded data to thereby reconstruct data, there may be a slight difference between the reconstruction data and the input data, and the autoencoder can reconstruct data or evaluate reliability of input data based on the difference. For example, the autoencoder illustrated in FIG. 9(*b*) is configured such that a size of an input layer and a size of an output layer are 5 and are the same, a size of a first hidden layer is 3, a size of a second hidden layer is 2, and a size of a third hidden layer is 3. That is, the number of nodes of the hidden layer gradually decreases as it goes to the middle layer, and gradually increases as it approaches the output layer. The autoencoder illustrated in FIG. 9(*b*) is merely an example, and embodiments are not limited thereto. The autoencoder may compare an input value of original data with an output value of reconstruction data to determine that corresponding data is not learned if there is a large difference between the input value and the output value and to determine that corresponding data has been already learned if there is a small difference between them. Thus, reliability of input data can be improved by using the autoencoder.

A learned artificial neural network model according to an embodiment of the present disclosure may apply information about a type of detergent as learning data. In this instance, the information about the type of detergent may include video image information, voice information, and the like. The artificial neural network model that has been learned repeatedly several times may stop the learning and may be stored in a memory of an AI device if an error value is less than a reference value. If video information or voice information about the type of detergent is input, a washing machine may determine and classify the type of detergent based on the corresponding information by using the learned artificial neural network model.

Figure 10:
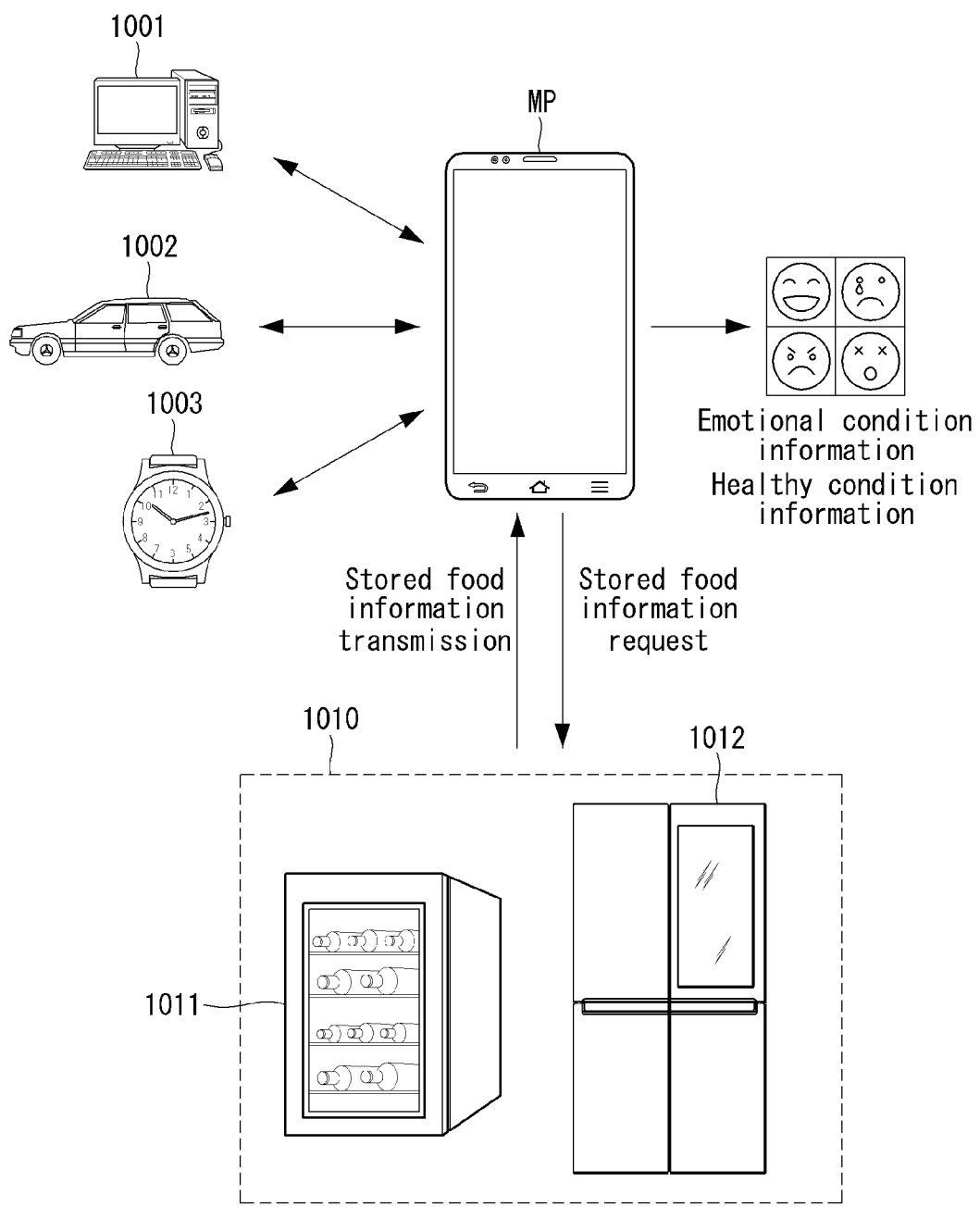
FIG. 10 is a system diagram according to an embodiment of the present disclosure.

FIG. 10 is a system diagram according to an embodiment of the present disclosure.

Referring to FIG. 10, a user status and preferred food determination system according to an embodiment of the present disclosure may include a mobile terminal MP, external terminals 1001, 1002, 1003, . . . connected to the mobile terminal MP, and kitchen appliances 1010.

FIG. 10 illustrates a PC 1001, a vehicle 1002, and a smart watch 1003 as the external terminals 1001, 1002, 1003, . . . , by way of example. However, FIG. 10 illustrates and enumerates the external terminals by way of example, and configurations of the external terminals 1001, 1002, 1003, . . . are not limited thereto. For example, the external terminals 1001, 1002, 1003, . . . may further include a Bluetooth device, a robot, a drone, an AR device, a mobile device, home appliances, and the like.

The external terminals 1001, 1002, 1003, . . . may obtain emotional condition information or healthy condition information of the user. For example, the PC 1001 may obtain information about a usage time of software related to productivity for business hours, and the smart watch 1003 may obtain information such as movement information, a heart rate, an exercise time, and a blood oxygen saturation degree of the user, whether the user exercise, and the like. Further, the vehicle 1002 may obtain movement information (e.g., navigation information) through the vehicle 1002 and information about music transmitted through an acoustic device of the vehicle 1002, and may also obtain facial expression and behavior recognition information through DSM/PSM.

The mobile terminal MP may obtain user status information. For example, the mobile terminal MP may obtain movement information (e.g., GPS information) of the user, schedule information stored in the calendar, image information, music information transmitted through audio equipment, and the like.

Information on the user status obtained through at least one external terminal 1001, 1002, 1003, . . . as above may be transmitted and stored to the mobile terminal MP, and then the mobile terminal MP may determine the user status based on the obtained user status information. In this instance, the user status may refer to emotional conditions and healthy conditions of the user.

In this instance, the emotional conditions of the user may be primarily categorized into seven categories: anger, disgust, fear, happiness, sadness, surprise, and neutrality. The emotional conditions of the user may be categorized in more detail through a human behavioral unit (AU), but may be categorized into seven categories as emotions that are commonly felt in everyday life. Further, the healthy conditions of the user may be divided into normal, good, fatigue, disease, or the like.

The mobile terminal MP may obtain stored food information from the kitchen appliances 1010. The kitchen appliances 1010 may include a refrigerator 1012, a wine cellar 1011, and the like. The refrigerator 1012 may transmit image information about ingredients, side dishes, etc., and entry/exit history information of ingredients, side dishes, etc., that are stored in the refrigerator 1012, and the wine cellar 1011 may transmit image information of the wine in storage, detailed information about the wine, etc.

The mobile terminal MP may select food, which can be recommended to the user, depending on stored food information, information on user's preferred food that has been previously stored, and user status information. This is described in detail with reference to FIGS. 11 and 12.

Figure 11:
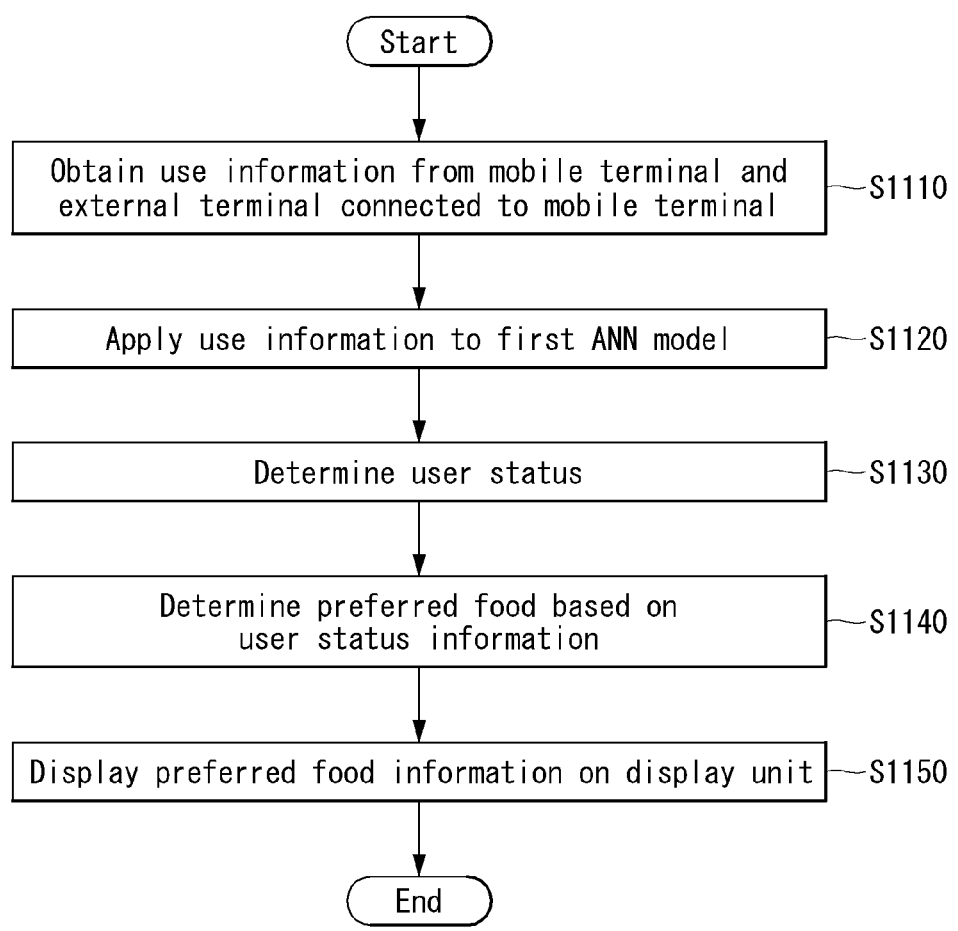
FIG. 11 is a flow chart illustrating a method of determining a user status and preferred food according to an embodiment of the present disclosure.

FIG. 11 is a flow chart illustrating a method of determining a user status and preferred food according to an embodiment of the present disclosure.

Referring to FIG. 11, the mobile terminal MP may obtain use information from the external terminals 1001, 1002, 1003, . . . connected to the mobile terminal MP in S1110. The use information may be different for each kind of the external terminals 1001, 1002, 1003, . . . as illustrated in FIG. 10, and may refer to information required to determine the user status.

The mobile terminal MP may apply the use information, as input data, to a first ANN model through the AI device 20 in S1120. The mobile terminal MP may previously sample data to be input to the first ANN model among the obtained use information and apply the sampled data to an input layer of the first ANN model. The first ANN model is previously supervised learned as information related to the user status and data related to emotional conditions and healthy conditions of the user. According to an embodiment of the present disclosure, the use information may include at least one of image information including the user, location information of the mobile terminal, hash tag information, previously input information about the user, information on music play history, body state information related to health of the user, facial recognition information of the user of an image, or history information about a past user status of the user. In particular, there is a useful effect that the mobile terminal MP can be customized as an electronic device for a specific user by using the history information about the past user status of the user as input data, The mobile terminal MP may determine the user status based on an output value of the first ANN model in S1130. More specifically, the first ANN model may output a specific value depending on an application of input data, and the AI device 20 may determine the user status from the output value. The user status may include emotional condition information and healthy condition information. As described above, the emotional conditions of the user may be primarily categorized into seven categories: anger, disgust, fear, happiness, sadness, surprise, and neutrality, and the healthy conditions of the user may be divided into normal, good, fatigue, disease, or the like.

In some embodiments, the emotional conditions of the user may be classified based on a stress level by calculating a stress index and dividing the corresponding stress index into a plurality of levels, in addition to the seven categories.

The mobile terminal MP may determine user's preferred food based on the determined user status information and the use information obtained from the mobile terminal MP and the external terminals 1001, 1002, 1003, . . . connected to the mobile terminal MP, in S1140. Determining the preferred food is described in detail below with reference to FIG. 12.

The mobile terminal MP may display preferred food information on a display unit of the mobile terminal MP in S1150. In some embodiments, the preferred food information may be displayed on a display unit of the kitchen appliances 1010 as well as the mobile terminal MP. For example, the preferred food information may be displayed on a display unit of the refrigerator 1012 or a display unit of the wine cellar 1011.

The preferred food information may include image information of the preferred food, recipe information of the preferred food, nutritional information of the preferred food, expert explanation of the preferred food, and the like. The display unit may include a touch screen. If a touch signal is input to a specific area indicating image information or recipe information of the preferred food, the display unit may enlarge and display the corresponding image information, or may enlarge and display detailed recipe information. In case of alcoholic beverages such as wine, soju, beer, and rice wine, if the display unit receives a touch input of image information, the display unit may display expert's detailed explanation regarding the corresponding alcoholic beverage.

Figure 12:
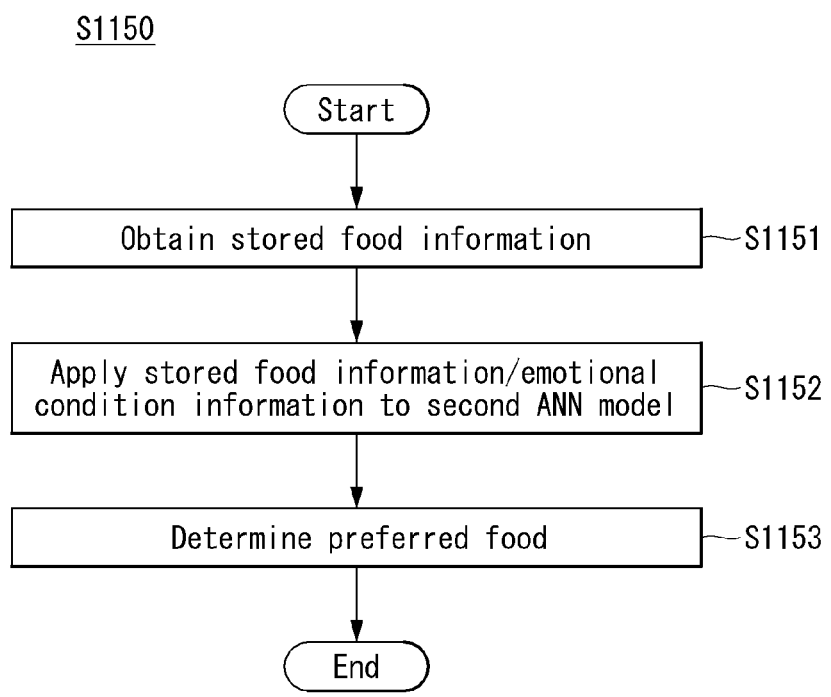
FIG. 12 is a flow chart illustrating a method of determining user's preferred food according to an embodiment of the present disclosure.

FIG. 12 is a flow chart illustrating a method of determining user's preferred food according to an embodiment of the present disclosure.

Referring to FIG. 12, the mobile terminal MP may receive stored food information obtained through an image acquisition unit of the kitchen appliances 1010 in S1151. In some embodiments, the kitchen appliances 1010 may manage a food entry and exit history, that has been stored, through a food entry and exit sensing unit as well as the image acquisition unit to obtain stored food information.

The mobile terminal MP may apply the stored food information and user status information obtained through the first ANN model to a second ANN model in S1152. The second ANN model is an artificial neural network model that has been previously supervised learned as emotional condition information and healthy condition information of the user, food information, information on user's preferred food.

The mobile terminal MP may determine preferred food based on a user's current status depending on an output value of the second ANN model in S1153. The preferred food may include a preferred cooking, a preferred drink, and a combination of the preferred cooking and the preferred drink. For example, if the user prefers to have a cup of 'red wine A' and a 'chop steak' on a tired day, the mobile terminal MP may recommend the chop steak and the red wine A based on such history information. In this instance, the preferred cooking may be a cooking that is classified as preferring to be taken together with the preferred drink based on web crawling information or past history information of the user.

Figure 13:
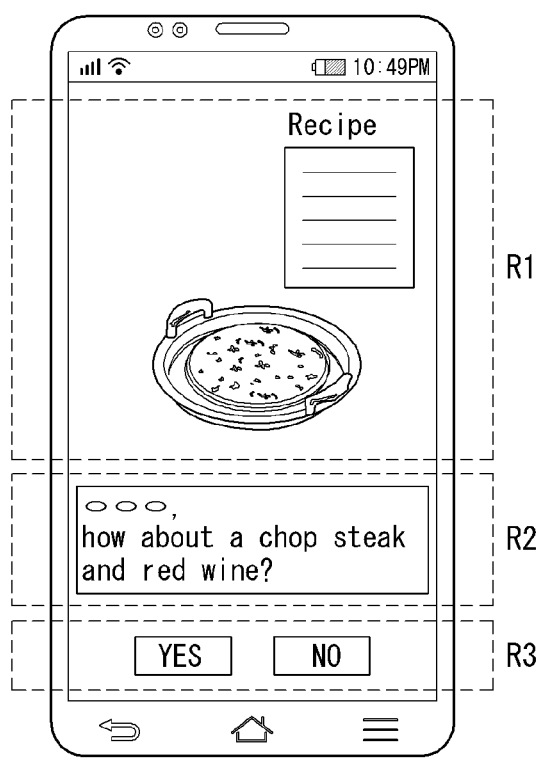
FIGS. 13 and 14 illustrate UI of a mobile terminal according to an embodiment of the present disclosure.
Figure 14:
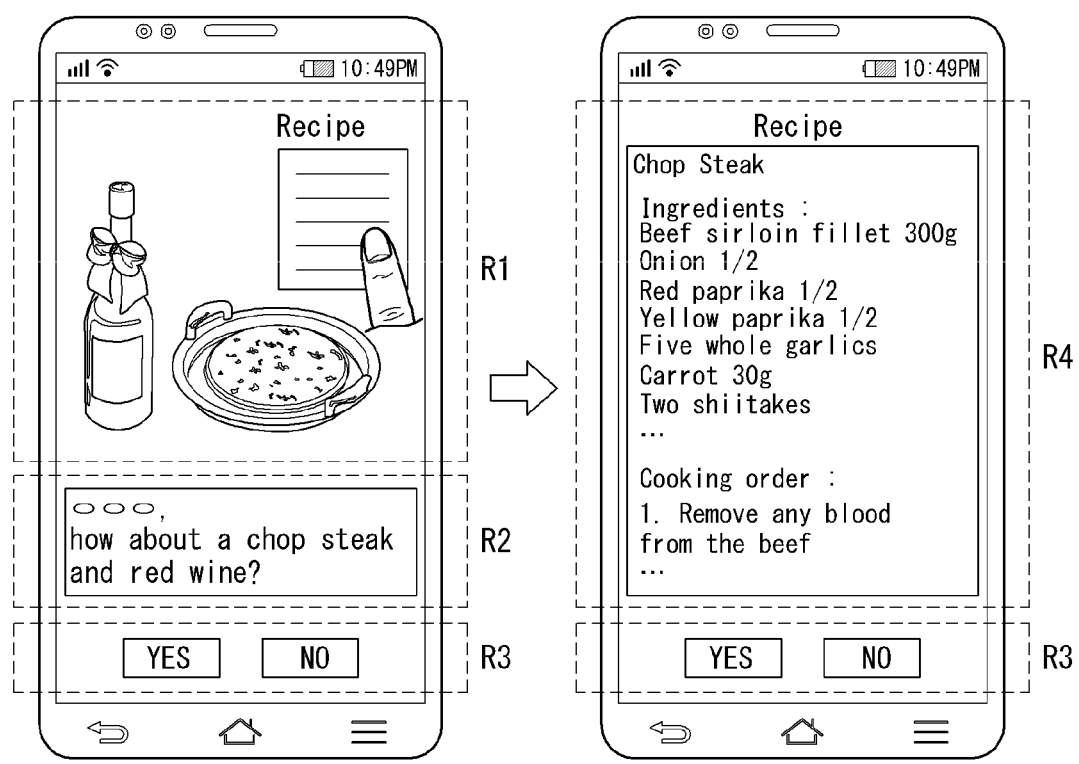

FIGS. 13 and 14 illustrate UI of a mobile terminal according to an embodiment of the present disclosure.

Referring to FIG. 13, on a display unit of the mobile terminal MP, preferred cooking and its recipe may be displayed on a first mobile terminal display area R1, a message confirming a user's intention may be displayed on a second mobile terminal display area R2, and a menu confirming the user's intention may be displayed on a third mobile terminal display area R3.

Referring to FIG. 14, if a touch signal is input to a first area, the first mobile terminal display area R1 may be extended to a fourth mobile terminal display area R4 and may display a detailed recipe of preferred food.

If a touch signal is input to the menu confirming the user's intention displayed on the third mobile terminal display area R3 of the mobile terminal MP, the mobile terminal MP may store user selection information about preferred cooking and preferred drink and transmit the user selection information to a network. In this instance, a past history of the user is updated according to the user selection information, and then tastes of the user are reflected in the use of an electronic device. Hence, a more reliable AI prediction result can be obtained.

Figure 15:
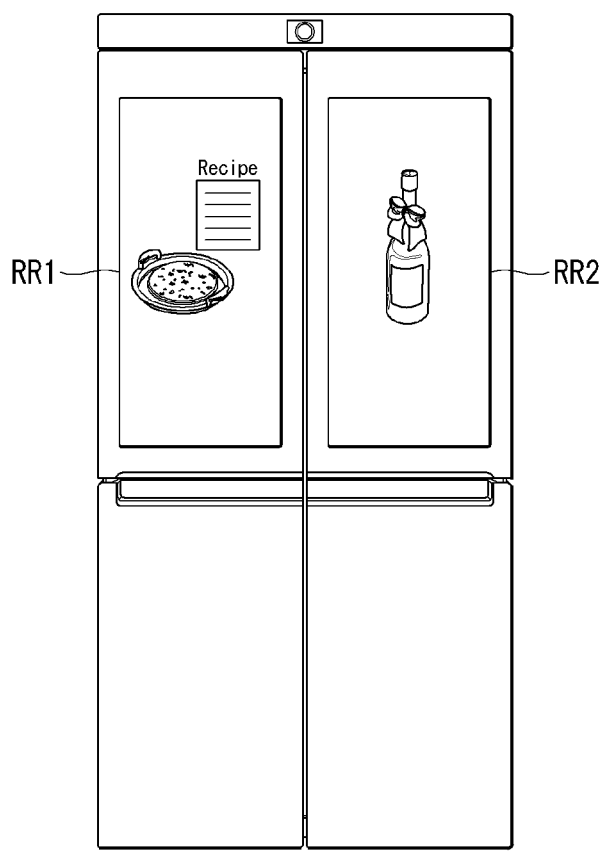
FIGS. 15 and 16 illustrate UI of a refrigerator according to an embodiment of the present disclosure.
Figure 16:
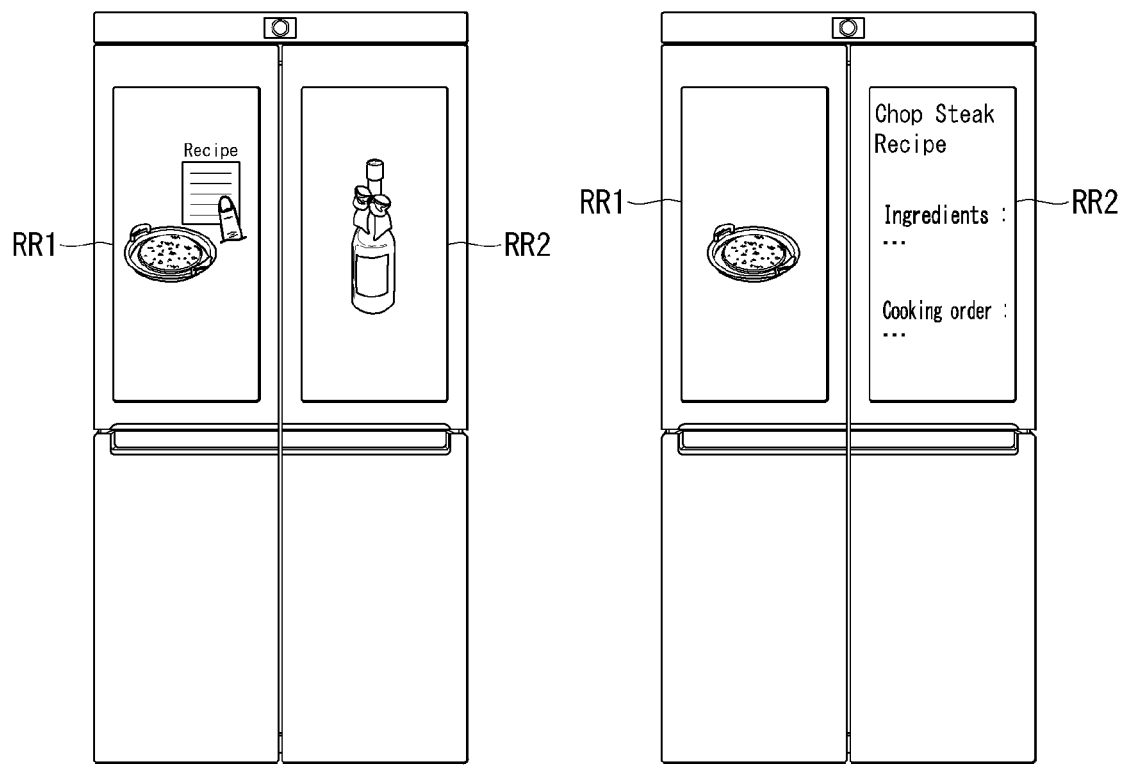

FIGS. 15 and 16 illustrate UI of a refrigerator according to an embodiment of the present disclosure.

Referring to FIG. 15, the refrigerator 1012 may include at least one display unit. Information about food that can be cooked through the ingredients provided in the refrigerator 1012 may be displayed on the display unit, and information about a drink stored in the refrigerator 1012 or the wine cellar 1011 may be displayed on different display units RR1 and RR2.

Referring to FIG. 16, if a touch signal is input to a first or second refrigerator display area RR1 or RR2 of the refrigerator 1012, detailed information about the cooking or the drink may be displayed on the first or second refrigerator display area RR1 or RR2. For example, FIG. 16 illustrates that a touch signal is applied to the first refrigerator display area RR1, and recipe information of preferred food is displayed on the second refrigerator display area RR2, by way of example. However, the present disclosure is not limited thereto, and information about the preferred cooking or the preferred drink may be displayed on one of the first and second refrigerator display areas RR1 and RR2.

Figure 17:
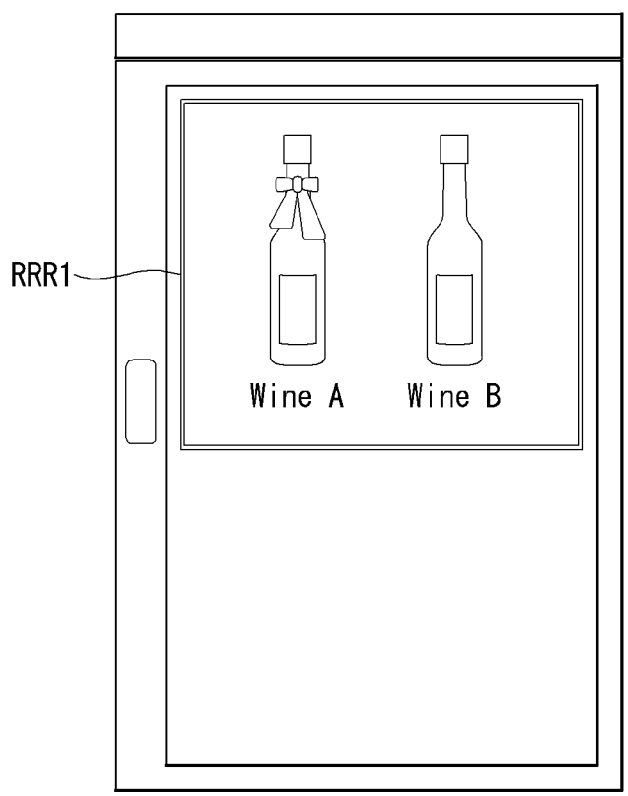
FIGS. 17 and 18 illustrate UI of a wine cellar according to an embodiment of the present disclosure.
Figure 18:
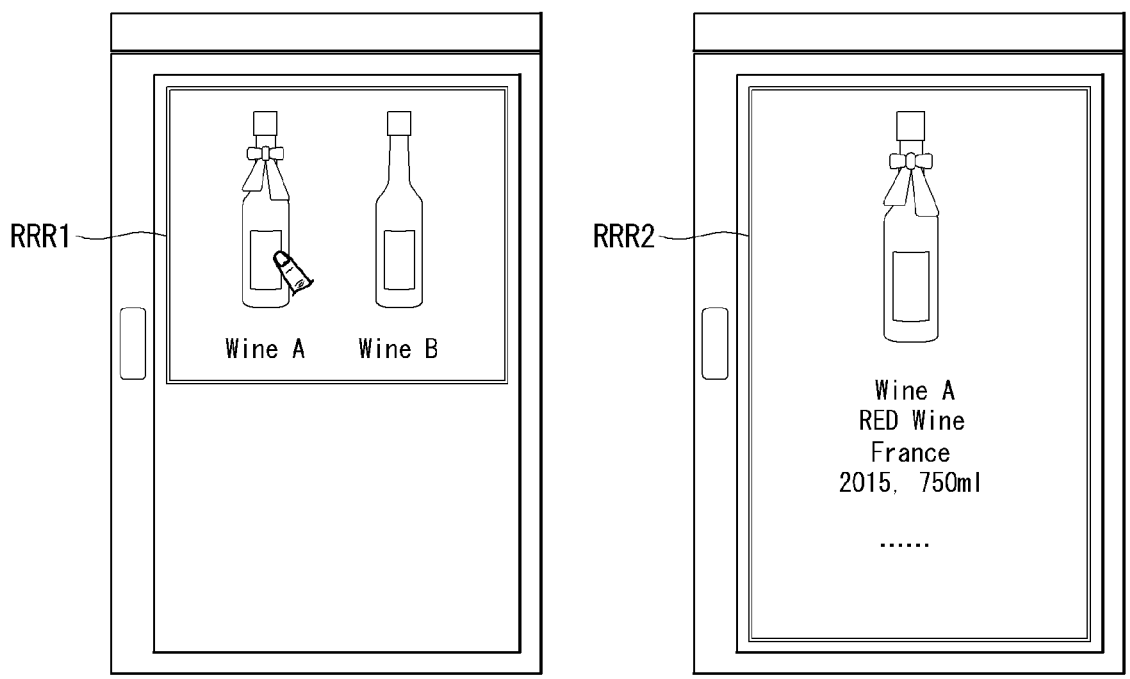

FIGS. 17 and 18 illustrate UI of a wine cellar according to an embodiment of the present disclosure.

Referring to FIG. 17, a door of the wine cellar 1011 may include a display unit. The display unit may display information about stored preferred drink.

Referring to FIG. 18, if a touch signal for a specific wine image is input to a first wine cellar display area RRR1 of the display unit of the wine cellar 1011, detailed information about the specific wine may be displayed on the display unit in response to the touch signal. More specifically, if the touch signal is input to the first wine cellar display area RRR1, the first wine cellar display area RRR1 may be extended to a second wine cellar display area RRR2, and detailed information including type of wine, name of wine, place of wine production, time of wine production, or capacity of wine, etc. may be displayed on the second wine cellar display area RRR2.

The present disclosure described above may be implemented using a computer-readable medium with programs recorded thereon for execution by a processor to perform various methods presented herein. The computer-readable medium includes all kinds of recording devices capable of storing data that is readable by a computer system. Examples of the computer-readable mediums include hard disk drive (HDD), solid state disk (SSD), silicon disk drive (SDD), ROM, RAM, CD-ROM, a magnetic tape, a floppy disk, an optical data storage device, the other types of storage mediums presented herein, and combinations thereof. If desired, the computer-readable medium may be realized in the form of a carrier wave (e.g., transmission over Internet). Thus, the foregoing description is merely an example and is not to be considered as limiting the present disclosure. The scope of the present disclosure should be determined by rational interpretation of the appended claims, and all changes within the equivalent range of the present disclosure are included in the scope of the present disclosure.

What is claimed is:

1. A method for recommending, by an artificial intelligence based mobile terminal, food based on an artificial intelligence based user status, the method comprising:
    obtaining at least one use information from the mobile terminal and an external terminal connected to the mobile terminal;
    applying the use information to a first artificial neural network (ANN) model that has been previously learned;
    determining user status information based on an output value of the first ANN model; and
    determining a preferred food of a user based on the user status information and stored food information of a kitchen appliance,
    wherein the user status information includes an emotional condition and a health condition,
    wherein the preferred food includes a preferred cooking, a preferred drink, and a combination of the preferred cooking and the preferred drink selected from the stored food information, and
    wherein the preferred cooking is a cooking that is classified as being taken at the same time as the preferred drink based on web crawling information and past history information of the user.

2. The method of claim 1, wherein the first ANN model is an ANN model that is supervised learned by applying the use information as learning data, and
    wherein the use information includes at least one of image information including the user, location information of the mobile terminal, hash tag information, previously input information about the user, information on music play history, body state information related to health of the user, facial recognition information of the user of an image, or history information about a past user status of the user.

3. The method of claim 1, wherein the determining of the preferred food comprises:
    receiving the stored food information of the kitchen appliance from a network;
    applying the stored food information and the user status information to a second ANN model; and
    determining the preferred food that is able to be set from the stored food based on an output value of the second ANN model.

4. The method of claim 3, wherein the second ANN model is an ANN model that is supervised learned by setting the user status information and the stored food information as input layer learning data and setting information about the preferred food as output layer learning data, and
    wherein the information on the preferred food includes at least one of image information or recipe information about the preferred food.

5. The method of claim 4, further comprising:
    displaying the information about the preferred food on a display unit of the mobile terminal.

6. The method of claim 1, wherein the first ANN model is stored in a network, and
    wherein the applying of the use information to the first ANN model comprises:
        transmitting the use information to the network; and
        obtaining a result of applying the use information received from the network to the first ANN model.

7. The method of claim 4, wherein the second ANN model is stored in the network, and
wherein the applying of the stored food information and the user status information to the second ANN model comprises:
transmitting the stored food information to the network; and
obtaining a result of applying the stored food information and the user status information received from the network to the second ANN model.

8. A method for recommending, by an artificial intelligence based kitchen appliance, food based on an artificial intelligence based user status, the method comprising:
receiving user status information from a mobile terminal connected to the kitchen appliance; and
determining a preferred food of a user based on the user status information and stored food information of the kitchen appliance,
wherein the user status information includes an emotional condition and a health condition,
wherein the preferred food includes a preferred cooking, a preferred drink, and a combination of the preferred cooking and the preferred drink selected from the stored food information, and
wherein the preferred cooking is a cooking that is classified as being taken at the same time as the preferred drink based on web crawling information and past history information of the user.

9. The method of claim 8, wherein the user status information is generated based on an output value of a first artificial neural network (ANN) model by obtaining at least one use information from the mobile terminal and an external terminal connected to the mobile terminal and applying the use information to the first ANN model that has been previously learned.

10. The method of claim 8, wherein the use information includes at least one of image information including the user, location information of the mobile terminal, hash tag information, previously input information about the user, information on music play history, body state information related to health of the user, facial recognition information of the user of an image, or history information about a past user status of the user.

11. The method of claim 8, wherein the determining of the preferred food comprises:
obtaining the stored food information of the kitchen appliance through an image acquisition unit;
applying the stored food information to a second ANN model; and
determining the preferred food that is able to be set from the stored food based on an output value of the second ANN model.

12. The method of claim 11, wherein the second ANN model is an ANN model that is supervised learned by setting the user status information and the stored food information as input layer learning data and setting information about the preferred food as output layer learning data, and
wherein information on the preferred food includes at least one of image information or recipe information about the preferred food.

13. The method of claim 11, further comprising:
displaying the information about the preferred food on a display unit of the kitchen appliance.

14. A food recommendation device based on an artificial intelligence based user status, the food recommendation device comprising:
a memory;
a transceiver; and
a processor,
wherein the processor is configured to:
apply use information of a mobile terminal and an external terminal connected to the mobile terminal, that is received through the transceiver, to a first artificial neural network (ANN) model that has been previously learned,
determine user status information based on an output value of the first ANN model, and
determine a preferred food of a user based on the user status information and stored food information of a kitchen appliance,
wherein the user status information includes an emotional condition and a health condition,
wherein the preferred food includes a preferred cooking, a preferred drink, and a combination of the preferred cooking and the preferred drink selected from the stored food information, and
wherein the preferred cooking is a cooking that is classified as being taken at the same time as the preferred drink based on web crawling information and past history information of the user.

15. The food recommendation device of claim 14, wherein the processor is configured to:
apply the stored food information of the kitchen appliance obtained from a network and the user status information to a second ANN model; and
determine the preferred food that is able to be set from the stored food based on an output value of the second ANN model.

16. The food recommendation device of claim 14, wherein the processor is configured to receive, through the transceiver, the use information of the external terminal from the external terminal via an MTC physical uplink shared channel (MPUSCH) and/or an MTC physical uplink control channel (MPUCCH), that are physical resources provided through massive machine-type communication (mMTC) service.

17. The food recommendation device of claim 16, wherein a 5G wireless communication system includes a narrowband-Internet of Things (NB-IoT) system that provides a system bandwidth related to some resource blocks of the 5G wireless communication system and provides the mMTC service, and
wherein the processor is configured to, through the transceiver:
perform an initial connection procedure to the 5G wireless communication system via an anchor type carrier related to the NB-IoT system; and
transmit the user status information to the kitchen appliance via a non-anchor type carrier related to the NB-IoT system.

* * * * *